United States Patent
Lu et al.

(10) Patent No.: US 11,392,490 B2
(45) Date of Patent: Jul. 19, 2022

(54) MARKING IMPACTED SIMILARITY GROUPS IN GARBAGE COLLECTION OPERATIONS IN DEDUPLICATED STORAGE SYSTEMS

(71) Applicant: EMC IP Holding Company LLC, Hopkinton, MA (US)

(72) Inventors: Kimberly R. Lu, Sunnyvale, CA (US); Joseph S. Brandt, Salt Lake City, UT (US); Nicholas A. Noto, Sunnyvale, CA (US); Tipper Truong, San Jose, CA (US); Mariah Arevalo, Woodland, CA (US); Philip Shilane, Newtown, PA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 166 days.

(21) Appl. No.: 16/370,413

(22) Filed: Mar. 29, 2019

(65) Prior Publication Data
US 2020/0310964 A1    Oct. 1, 2020

(51) Int. Cl.
*G06F 12/02* (2006.01)
*G06F 3/06* (2006.01)

(52) U.S. Cl.
CPC ........ *G06F 12/0253* (2013.01); *G06F 3/0604* (2013.01); *G06F 3/0652* (2013.01); *G06F 3/0683* (2013.01)

(58) Field of Classification Search
CPC ......... G06F 12/0253; G06F 2212/1044; G06F 2212/1048; G06F 2212/154; G06F 3/0604; G06F 3/0652; G06F 3/0683
See application file for complete search history.

(56) References Cited

U.S. PATENT DOCUMENTS

| | | |
|---|---|---|
| 8,140,821 B1 | 3/2012 | Raizen et al. |
| 8,170,213 B1 * | 5/2012 | Harwood ............... H04L 9/0822 380/277 |
| 8,712,978 B1 | 4/2014 | Shilane et al. |
| 8,825,720 B1 * | 9/2014 | Xie ..................... G06F 16/1727 707/813 |
| 9,405,764 B1 | 8/2016 | Wallace et al. |
| 9,411,815 B1 | 8/2016 | Lu et al. |
| 10,235,285 B1 | 3/2019 | Wallace |
| 10,262,024 B1 | 4/2019 | Subramanian |

(Continued)

FOREIGN PATENT DOCUMENTS

WO    2018/191709 A1    10/2018

OTHER PUBLICATIONS

U.S. Appl. No. 16/265,491, filed Feb. 1, 2109, Shilane et al.

(Continued)

*Primary Examiner* — Andrew J Cheong
(74) *Attorney, Agent, or Firm* — Workman Nydegger

(57) ABSTRACT

Systems and methods for marking similarity groups impacted by a garbage collection operation are disclosed. Similarity groups are used to identify segments associated with objects in a computing system. Using deletion records that identify objects to be deleted, the similarity groups impacted by the deletion records can be identified. The live segments associated with the impacted similarity groups are also identified. This allows segments that are associated with the deleted objects and that are not associated with any live objects to be removed.

20 Claims, 18 Drawing Sheets

(56) References Cited

U.S. PATENT DOCUMENTS

| | | |
|---|---|---|
| 10,776,321 B1 | 9/2020 | Balcha et al. |
| 2008/0005111 A1 | 1/2008 | Savage |
| 2011/0167096 A1 | 7/2011 | Guo et al. |
| 2011/0225214 A1 | 9/2011 | Guo |
| 2014/0149794 A1* | 5/2014 | Shetty ............... H04L 67/1095 714/20 |
| 2015/0121029 A1* | 4/2015 | Declercq ............ G06F 11/3466 711/170 |
| 2016/0292178 A1 | 10/2016 | Manville et al. |
| 2017/0116247 A1 | 4/2017 | Jonsson et al. |
| 2018/0024920 A1 | 1/2018 | Thomas et al. |
| 2018/0113805 A1 | 4/2018 | Horie et al. |
| 2018/0191709 A1 | 7/2018 | Thayer et al. |
| 2018/0276120 A1 | 9/2018 | Vytiniotis et al. |
| 2018/0373615 A1 | 12/2018 | Xia et al. |
| 2019/0018742 A1* | 1/2019 | Thomsen ............ G06F 11/1448 |
| 2020/0019629 A1 | 1/2020 | Shilane et al. |
| 2020/0133841 A1 | 4/2020 | Davis et al. |
| 2020/0310962 A1 | 10/2020 | Mulholland et al. |
| 2020/0334143 A1 | 10/2020 | Noto et al. |

OTHER PUBLICATIONS

U.S. Appl. No. 16/389,763, filed Apr. 19, 2019, Noto et al.
U.S. Appl. No. 16/370,440, filed Mar. 29, 2019, Brandt et al.
International Search Report and Written Opinion of PCT/US2019/054575 dated Jan. 8, 2020.
U.S. Patent Applicatiion filed Mar. 29, 2019, by Lu et al., U.S. Appl. No. 16/370,413.
U.S. Patent Application filed Apr. 19, 2019, by Nicholas A et al., Entitled "Estimating Worker Nodes Needed for Performing Garbage Collection Operations,", U.S. Appl. No. 16/389,763.
U.S. Patent Application filed Feb. 1, 2019, by Shilane et al., Entitled "Scalable Garbage Collection for Deduplicated Storage,", U.S. Appl. No. 16/265,491.
PCT/US2019/066873, Mar. 30, 2020, ISR and Written Opinion.

* cited by examiner

MARKING IMPACTED SIMILARITY GROUPS IN GARBAGE COLLECTION OPERATIONS IN DEDUPLICATED STORAGE SYSTEMS

FIELD OF THE INVENTION

Embodiments of the invention relate to systems, apparatus, and methods for performing data protection operations such as collecting garbage. More particularly, embodiments of the invention relate to systems and methods for collecting garbage in a deduplicated storage system such as a deduplicated cloud based storage system. More particularly, embodiments of the invention relate to systems and methods for marking or identifying data objects or similarity groups impacted by data protection operations such as garbage collection operations.

BACKGROUND

Protecting data is a fundamental aspect of computer technologies today. If data is not protected, the data is more likely to be lost and the loss of data can result in significant harm to an entity. Consequently, many entities store their data or backups of their data in a storage system such as a cloud based storage system. However, protecting data is substantially more complex than simply storing a copy of data in the cloud because of the associated costs and because of requirements and policies that are imposed on or associated with the data. Backups, for example, are often subject to backup policies (e.g., daily, weekly, monthly creation of backups) and retention policies. This results in a substantial amount of data that has a corresponding cost in terms of both storage requirements and computational requirements even when the data is deduplicated.

For various reasons, backups are generally deleted over time. For example, a system may delete a backup when a retention period expires. Deleting a backup is not a trivial task, particularly in deduplicated storage systems. In deduplicated systems, data is often divided into chunks or segments and stored in a deduplicated form. This reduces storage requirements (and cost) by allowing the same chunks or segments to be used for multiple backups or multiple objects.

Inevitably, some of the data or objects stored in the data protection system are dead. Dead objects or dead data are not referenced or are no longer needed by the client or the storage system. As backups expire and for other reasons, backup systems perform garbage collection operations to delete or remove objects that are no longer referenced by any of the valid backups. This cannot be achieved, however, by simply deleting the segments of a dead object because those same segments may correspond to a live object. Further, conventional approaches such as reference counts are unwieldy because they may require the protection system to maintain billions of counts. Reference counts thus consume significant storage and they are very difficult to manage, particularly in distributed and cloud based systems.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1A:
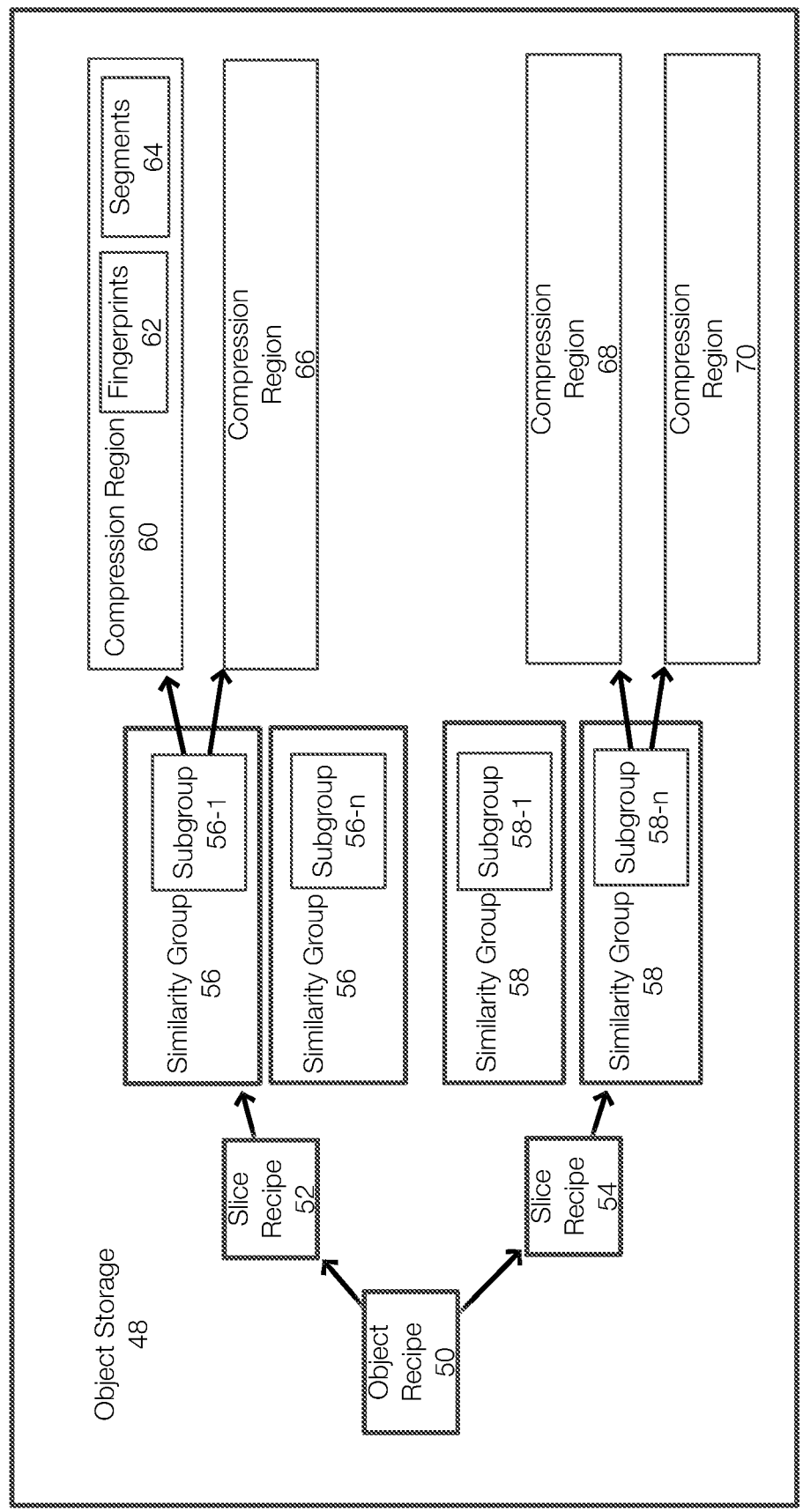
FIG. 1A illustrates an example of a manner for storing deduplicated data in a storage system such as a cloud based storage system.

Embodiments of the invention relate to systems, apparatus, and methods for providing or performing data protection operations. Example data protection operations include, but are not limited to, backup operations, recovery operations, deduplication operations, replication operations, and/or garbage collection operations. A garbage collection operation, by way of example, is performed to clean a storage system of dead objects or of unreferenced objects. Stated differently, a garbage collection operation is performed to remove objects from a storage system that are no longer needed by a client or no longer referenced by or part of a live object.

Deleting an object is complicated in a deduplicated storage system because segments associated with a deleted object cannot be immediately removed from the storage system because some of the deleted object's segments may be associated with other live objects. Without limitation, a live object may be an object that should be kept in the storage system. A dead object is an object that can be discarded or removed from the storage system. An object may represent data, files, data sets such as backup data sets, single files, or the like or combination thereof. The data protection operations discussed herein may be performed in a system such as DELL EMC Data Domain including cloud implementations.

Embodiments of the invention relate to garbage collection operations that ensure data integrity, that incur no monetary cost when not running, and are scalable to meet performance and/or time constraints. In addition, embodiments of the invention support concurrent reads/writes while garbage collection is performed. Embodiments of the invention further simplify difficulties associated with coding and debugging activities.

In one example, a cloud based data protection system (protection system) may be implemented as a microservice or a container-based application and may be configured to operate in a cloud environment. More specifically, garbage collection may be implemented as a microservice that cleans a storage system of objects deleted by clients or deleted in accordance with retention policies by removing unreferenced segments (or other data representations or structures) from the storage system without impacting live segments. The protection system may run in containers and the protection system can be scaled up and down as needed. Components of the protection system may be implemented as microservices.

Embodiments of the invention improve the operation of a data protection system including operations performed by the data protection system by ensuring that unreferenced data is not consuming storage unnecessarily and by ensuring that the unreferenced data is not consuming computational resources. More specifically, by removing dead objects, the data protection system is not burdened with having to process data that is not referenced. This eliminates some processing and thus improves the operation of the data protection system. Plus, the cost of storage such as cloud based storage is often based on the amount of data stored. By performing garbage collection, dead objects or segments can be removed.

In some cloud systems, there is also a cost for consuming computational resources. Embodiments of the invention conserve computing resources at least because computing resources used for the garbage collection operation are only allocated and used while the garbage collection operation is executing. The computing resources can be released when the garbage collection operation is not running.

In one example, the protection system may deduplicate objects by dividing or chunking the objects into slices and segments (very large objects may be divided into parts that are divided into slices that are divided into segments.

FIG. 1A illustrates an example of how objects may be stored in a cloud based storage system. FIG. 1A illustrates an object storage 48, which may be an object storage bucket. The storage may be represented or configured in other manners. The actual data (the segments) of an object associated with an object recipe 50 are stored in compression regions, such as compression regions 60, 66, 68 and/or 70. Thus segments of an object associated with the object recipe 50 may be stored in one or more of the compression regions 60, 66, 68 and 70.

The compression region 60 may include segments 64 and fingerprints 62 of those segments 64. The other compression regions 66, 68 and 70 are similarly configured. In this example, the similarity group 56 is associated with multiple compression regions including the compression regions 60 and 66. Similarly, the similarity group 58 is associated with the compression regions 68 and 70.

The similarity group 56 may have or be associated with one or more subgroups, illustrated as subgroups 56-1 through subgroup 56-n. As illustrated, the similarity group 58 similarly includes subgroups 58-1 through 58-n. In this example, the similarity group 56 and subgroup 56-1 are each stored as an object. The other subgroups are similarly stored. Each subgroup may have the same similarity group identifier (ID) as the corresponding similarity group and the subgroups may be numbered differently (e.g., in ascending order). The similarity group 56 identifies the compression region names and associated fingerprints associated with an object. More specifically, the compression regions can be associated with specific subgroups. The slice recipe 52 identifies the similarity group and subgroup for a slice of an associated object. In one example, each slice is associated with a single similarity group. The object recipe 50 identifies the slices of an object.

In one example, the similarity group 56 includes a subgroup. In other words, an object is associated with a similarity group and a subgroup. As an example, a similarity group may be stored as an object with a group ID and a subgroup ID, but never without the subgroup ID. FIG. 1A illustrates that the similarity group 56 and the associated subgroups may be stored as separate objects. However, the recipes of the objects usually identify each of a similarity group, a subgroup, and compression regions.

FIG. 1A essentially illustrates a single object and that the object has been divided into two slices. In this example, each slice is about 8 MB. The object recipe 50 identifies all of the slices of the object. Thus, the object recipe 50 is generated when storing an associated object to a storage system and is used to reassemble the object when reading the object from the storage system. The object storage 48 may include a plurality of objects in this manner. Further, the object recipe 50, slice recipes 52, 54, similarity group 56, 58 and compression regions may all be independent objects in the object storage 48. In this example, the slice recipe 52 for the object identifies the similarity group 56:subgroup 56-1 and the slice recipe 54 identifies the similarity group 58:subgroup 58-n. Each subgroup may be associated with or identify multiple compression regions (e.g., segments 3, 4, and 5 in compression region 60 and segments 1 and 2 in compression region 66 (depending on the recipe).

During deduplication, an object may be divided into slices and the slices may be further divided or chunked into segments. The sizes of the slices and chunks are configurable. By way of example only, an object may be divided into 8 MB slices. Each of the slices may be divided into 8 KB segments. To perform deduplication, each slice is mapped to a similarity group. The similarity group may be determined based on the content of the slice or based on a function applied to the content of the slice. Because a slice is mapped to a similarity group, the segments or content of the slice being deduplicated may already be present in the similarity group. By way of example only, a slice may only be deduplicated with respect to the similarity group and with respect to a particular subgroup of the similarity group.

For example, an object recipe may identify a slice. The slice recipe may identify the similarity group and the subgroup. The compression regions are included or associated with the identified similarity group and subgroup.

During deduplication, unique fingerprints in compression regions may be appended to subgroup 1. Once the subgroup 1 reaches a threshold size, subgroup 2 is created. New fingerprints and compression regions for the similarity group are then added to subgroup 2 because the subgroup 1 is full. Additional subgroups are added as needed.

Generally, deduplication is performed by comparing fingerprints of segments to be written to the storage with the fingerprints of segments already stored by the protection system. A fingerprint is an identifier of a segment (e.g., a hash of the segment) and can be implemented in systems where the data is in the clear or encrypted.

In the context of a similarity group, fingerprints of the segments from an incoming slice are marked as duplicates if the fingerprints of the incoming segments match any of the fingerprints of the segments already stored in the similarity group. If the fingerprints of the segments from the incoming slice do not match any of the existing fingerprints for the similarity group, then these segments are considered to be new and are stored in the similarity group.

Figure 1B:
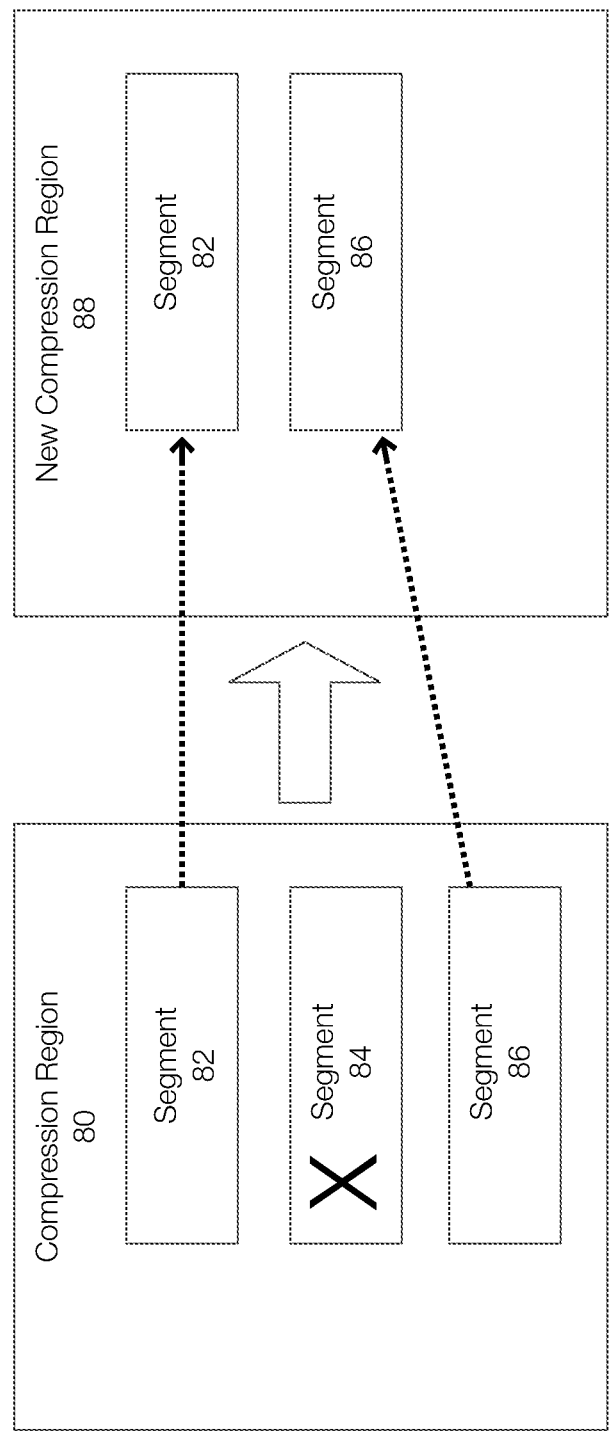
FIG. 1B illustrates an example of stored data before cleaning and after cleaning in a storage system such as a cloud based storage system.

FIG. 1B illustrates the result of a garbage collection operation. During garbage collection, it may be determined that a deleted object includes segments 82, 84 and 86 and that these segments are included in the compression region 80. It may also be determined that segments 82 and segments 86 are associated with another live object. Thus, the segments 82 and 86 are live segments while the segment 84 is dead and unreferenced by any other recipe. After identifying the live and dead segments, the compression region 80 is cleaned by only writing (e.g., copying forward) the live segments to the new compression region 88. The compression region 80 can then be deleted. Thus, similarity group associated with the compression region 80 is cleaned of dead segments and the new compression region 88 only contains the segments of the compression region 80 that were associated with live objects. In some object storage systems, it may not be possible to modify an existing object, so the compression region 80 cannot be changed directly. Instead a new compression region 88 is created during garbage collection with the live segments. The new compression region 88 could have the same name as compression region 80, in which case compression region 80 does not need to be deleted as it is replaced. In one example, unique names are generated for the compression regions based on their content.

In one example, a metadata server may be used to manage the similarity groups or to manage the fingerprints generally. The metadata server, for example, may store relationships between fingerprints, segments, and/or similarity groups. The metadata server may store all of the fingerprints of all segments managed by the protection system. During deduplication and/or garbage collection, the metadata server may be queried to determine whether a segment or group of segments are unique or duplicates or live. For example, when adding a slice to a similarity group, a query may be made to the metadata server using the fingerprints of the segments in the slice being added to determine if any of the segments are duplicates. Unique segments are added to the similarity group and duplicate segments are noted. Often, deduplication is only performed with respect to fingerprints associated with the similarity group and a specific subgroup of the similarity group.

Figure 1C:
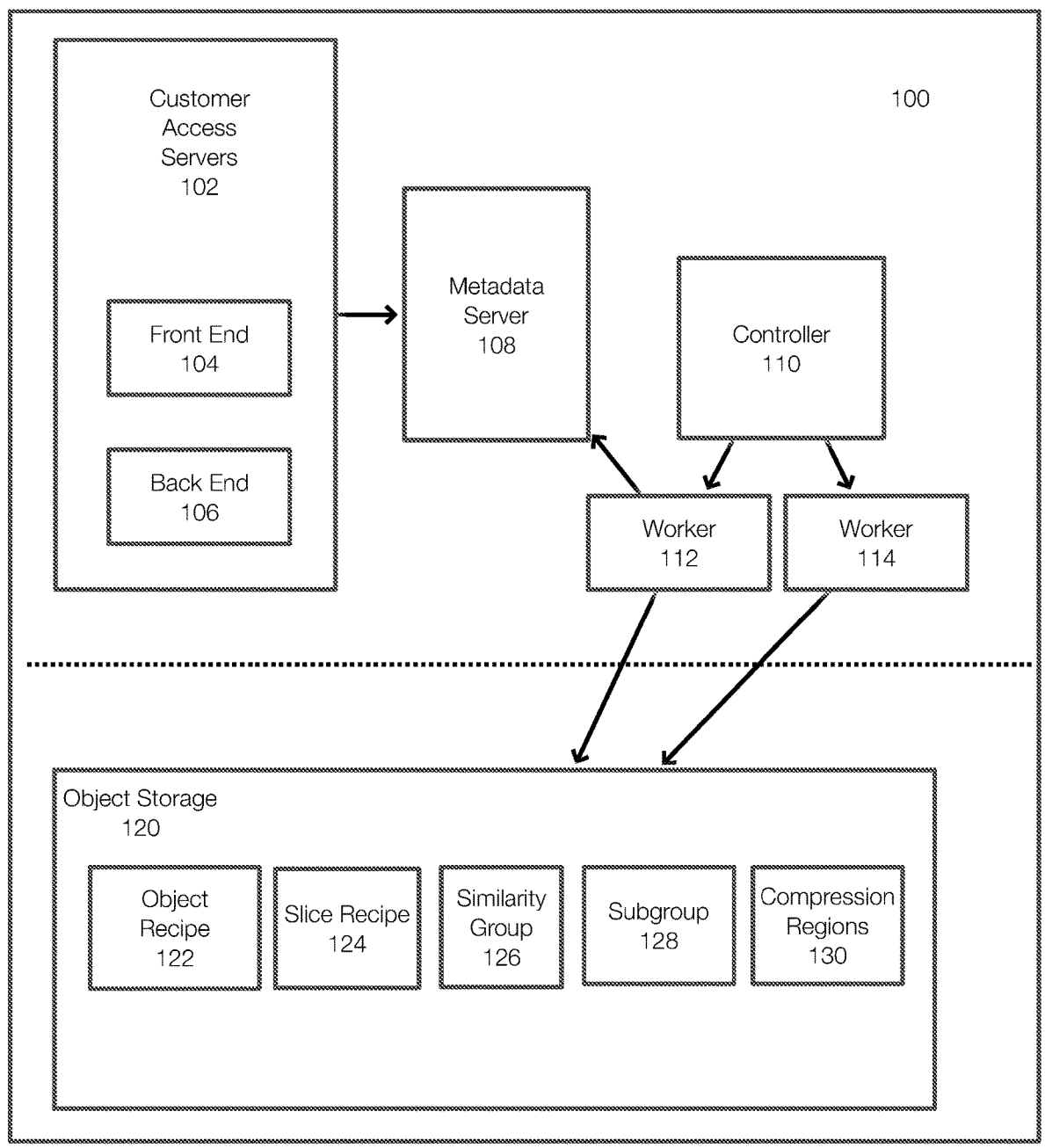
FIG. 1C illustrates an example of a protection system configured to perform data protection operations including garbage collection in a storage system such as a cloud based storage system.

FIG. 1C illustrates an example of a computing environment or a protection system that performs data protection operations including garbage collection. FIG. 1C illustrates a protection system 100 (or an example of deduplicated object storage system) and an object storage 120. The protection system 100 may be a containerized implementation of a data protection system and may include microservices. In one example, the protection system 100 may be implemented in a Kubernetes environment. The object storage 120 may be a cloud based storage system, such as one hosted in a datacenter. The object storage 120 may exist in an on-premises environment within a private cloud. The system 100 and/or the object storage 120 may be distributed in nature and may be scalable.

The object storage 120 is configured to store objects or data. The system 100 is configured to store the object or data in a deduplicated form, although deduplication may not be 100% in some situations. Objects may be stored in the object storage 120 as previously described. Thus, the object storage 120 may include an object recipe 122 that is associated with a slice recipe 124, a similarity group 126 (and subgroup 128) and compression regions 130.

The protection system 100 may include customer access servers 102. Customer access servers 102 may include a front end 104 and a back end 106. The front end 104 and the back end 106 may be microservices that run using allocated computing resources (processors, memory, and other needed hardware components). The front end 104 may provide an interface to customers. Objects may be received through the front end 104. Using the front end 104, a user or client may be able to view objects, add objects, delete objects, configure data protection operations such as backup operations and restore operations, or the like or combination thereof. In some example, the protection system 100 may place a logical construct between the clients and the actual data.

The front end 104 may also be responsible for dividing an object into slices. The back end 106 may be configured to perform various operations on data or objects. Once an object has been divided into slices (which may also be performed by the back end 106), the back end 106 may be responsible for calculating hashes and forming an object recipe, slice recipe, and the like, which can be stored in the object storage 120. The back end 106 may access the metadata server 108 in order to identify similarity groups for the slices. The back end 106 may generate or determine the object recipes and communicate with the metadata server 108.

In the context of garbage collection, garbage collection may be configured as a job that runs periodically or according to a schedule. When garbage collection is finished, the resources used to perform garbage collection can be released. This allows the resources to be acquired only when needed and released when not needed. This advantageously reduces cost compared to solutions that do not release computing resources.

Garbage Collection Overview

Garbage collection is governed or controlled by a controller 110 (e.g., a server or a node in the computing environment). The controller 110 may control one or more nodes such as worker 112 and worker 114 to perform garbage collection.

The data protection system 100 performs garbage collection by removing or deleting unreferenced or dead segments from the object storage 120. Although reference is made to segments, it is appreciated that embodiments of the invention can operate with other data representations.

By removing segments from the object storage 120, storage costs and computation costs are advantageously reduced. Embodiments of the invention also account for the fact that, in a cloud storage system, the protection system 100 will not run out of storage. This allows garbage collection operations some leeway when collecting garbage and allows the protection system 100 to wait on objects that are partially live (e.g., associated with some segments that are associated with another object). Further, computation cost, which is typically higher than storage costs, can be kept down or reduced by continuing to store partially-live objects for some period of time. For example, a compression region may include live and dead segments. If the number of dead segments is low, then it may be more beneficial to wait until the percentage of dead segments passes a threshold before cleaning the compression region.

Embodiments of the invention also allocate computation resources (e.g., worker nodes) based on the amount of work to be performed and based on the resources needed to perform the garbage collection operation and/or based on constraints such as memory constraints, IO constraints, throughput constraints, or the like.

In one example, deletion buckets are used to perform garbage collection. A deletion bucket stores records corresponding to objects that have been deleted or that were never completed (e.g., partially written). When the garbage collection process is performed, the records in the deletion bucket are processed.

The following discussion references buckets. A bucket is a general representation of at least a portion of a storage system. Objects may be stored in an object storage bucket. When a client-written object is deleted or when an object is deleted for another reason, a deletion record for the deleted object is added to a deletion bucket. A deletion record may identify the client-written object in some manner, such as by the object's recipe. In one example, the deletion record may only include the object's name (the name may be sufficient to identify the recipe). Thus, the deletion record may include some information about the object. This allows the relevant segments to be identified during the garbage collection operation. The recipe may identify the similarity groups and the compression regions associated with the object. The amount or kind of data stored in the deletion record can thus vary. Using the deletion records, the controller 110 and the workers 112, 114 are able to identify all of the impacted similarity groups (those that may include dead segments) using the deletion records and clean the object storage 120.

The impacted similarity groups (or specific subgroups) may be write-locked so that incoming objects do not impact the similarity groups/subgroups being cleaned. To ensure that the write access is preserved during a garbage collection operation, new subgroups may be added to the impacted similarity groups as necessary. Any objects written to the object storage 120 during a garbage collection operation may be deduplicated with respect to the new and/or unimpacted similarity groups or with respect to similarity groups or subgroups that are not write locked.

In one example, the garbage collection process workload is divided into portions (often on a similarity group basis) and assigned to the workers. After identifying which of the similarity groups and subgroups are impacted by the garbage collection process, the controller 110 and/or the workers 112, 114 may identify and mark live fingerprints in their respective similarity groups. For example, an object that has been deleted may be composed of segments 1, 2, 3, 4 and 5. Another object that has not been deleted may include segments 1, 2, 3, 6 and 7. In this case, the fingerprints (or identifiers such as a hash) of segments 1, 2, 3, 6 and 7 may be marked as live. The segments 4 and 5 are subject to deletion.

Live segments in the similarity group/subgroup (and more specifically in a compression region) are then carried forward into new compression regions. For example, if a compression region included segments 1, 2, 3, 4 and 5, the new compression region would include segments 1, 2 and 3. The old compression region, which included segments 4 and 5, is removed or deleted. Thus, the unused or unreferenced segments 4 and 5 are cleaned from the object storage 120. The write locks can then be released.

Garbage Collection

Figure 2:
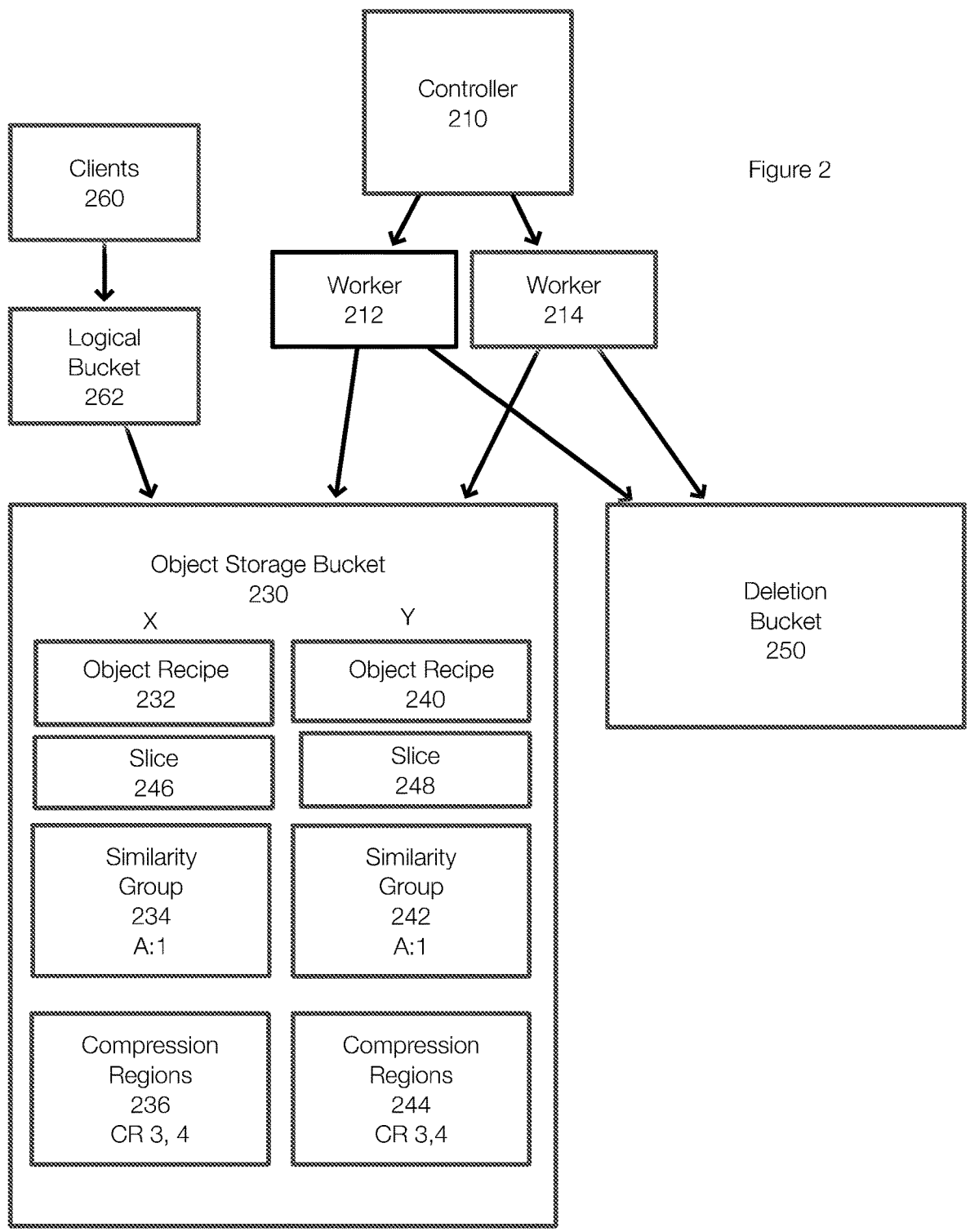
FIG. 2 illustrates an example of an object storage bucket and a deletion bucket that is used by a protection system to clean the object storage.
Figure 3:
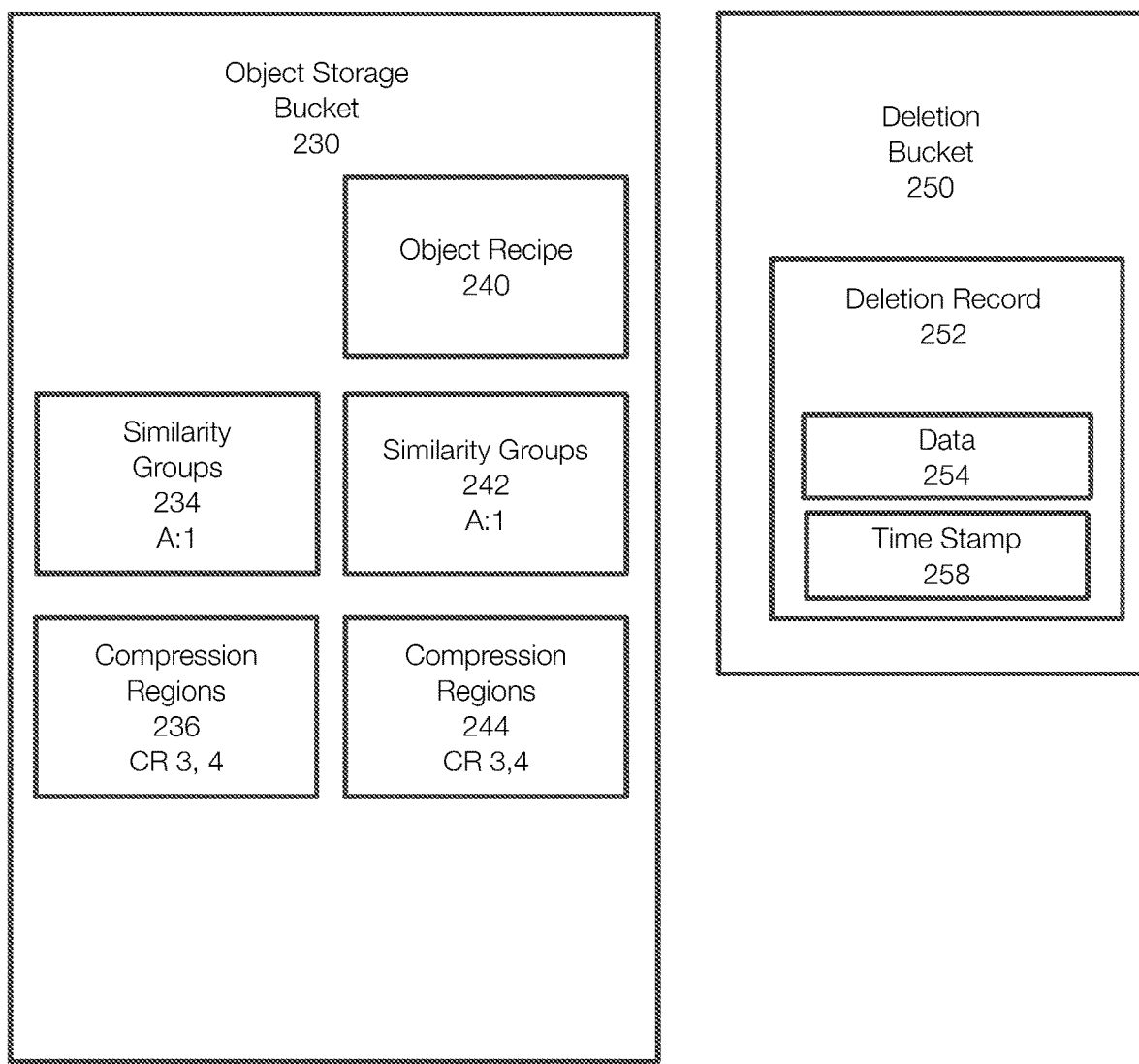
FIG. 3 illustrates a process of moving an object from the object storage bucket to the deletion bucket in preparation for performing garbage collection operations.
Figure 4:
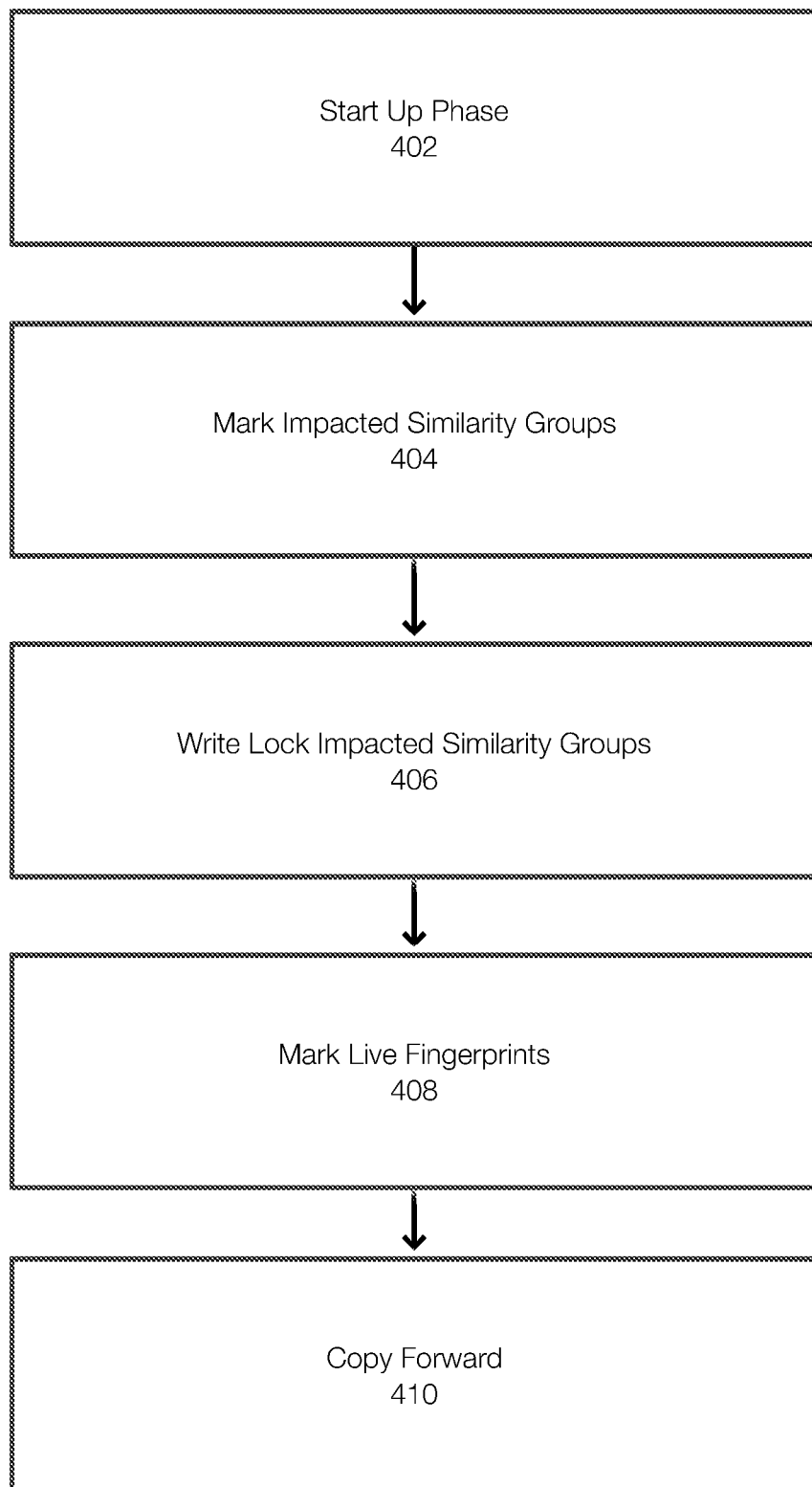
FIG. 4 illustrates an example of a method for performing a data protection operation such as garbage collection.

FIGS. 2-4 illustrate aspects of a garbage collection operation and a protection system that performs garbage collection. In the following discussion, the term bucket is used in describing how objects and records are stored. However, the objects and records can be stored in other structures such as containers, a database, or the like. In object storage, clients can organize their objects within structures called buckets. Buckets can be created and deleted, and objects within a bucket can be listed based on a (possibly empty) prefix string or in other manners. In one example, a layer of indirection such as a logical bucket 262 may be implemented between clients 260 and the bucket 230. The clients 260 may interact with the logical bucket 262. String manipulations may be performed on the various bucket names before querying the underlying object storage bucket 230.

In FIG. 2 and by way of example, the storage system may include an object storage bucket 230 (or multiple buckets) and a deletion bucket 250. During the garbage collection operation, a controller 210 (the controller may be instantiated based on a schedule or on demand) may create one or more workers (e.g., the worker 212 and the worker 214) and assign a portion of the work to be performed to each of the workers 212, 214. In one example, each worker may be assigned a range of similarity groups. In one example, the controller 210 and the workers 212 and 214 may be implemented as pods.

The controller 210 (and/or the workers) may determine which similarity groups are impacted by the garbage collection operation. This determination is based, for example, on records included in the deletion bucket 250. As previously stated, it may be impractical to clean all of the segments associated with an object at the time that a client deletes the object because of deduplication. Instead, the garbage collection operation focuses on the structures referenced from the deleted objects. When a client deletes an object from the object storage 230 or when an object is deleted for another reason, the object's object recipe may be removed (e.g., moved to the deletion bucket 220) and may not be visible to the client.

In this example, the object storage bucket 230 includes object X and object Y. The object X has an object recipe 232. For simplicity, a single slice is assumed for each of the objects X (slice 246) and Y (slice 248). The slice 246 of object X is associated with a similarity group 234 (specifically similarity group A, subgroup 1). The segments of the object X are physically stored in compression regions 236 (specifically compression regions 3 and 4). Similarly, the object Y has an object recipe 240 and is associated with similarity group 242 (specifically similarity group A, subgroup 1) and compression regions 244 (compression regions 3 and 4). This demonstrates that compression regions and similarity groups can be referenced by multiple object recipes to achieve deduplication.

A client may delete the object X. When the object X is deleted by a client or in accordance with a retention policy or for other reason, the object recipe 232 is removed from the object store bucket 230 and may be stored in the deletion bucket 250.

FIG. 3 illustrates this process and shows that a deletion record 252 corresponding to the object associated with the object recipe 232 has been placed in the deletion bucket 250. The deletion record 252 may include data 254 and/or a time stamp 258. In one example, the data 254 corresponds to the object recipe 232. As a result, the object X is no longer visible to the client 260. The name of the object X may be recorded in the deletion bucket 250 as the data 254 instead of copying object recipe 232. This information (e.g., object recipe 232, object name, etc.) is an example of a deletion record 252. The deletion bucket 250 is then used during the garbage collection process to clean the object storage bucket 230.

In addition to objects explicitly deleted by clients or deleted because of policies such as retention policies, embodiments of the invention also clean or delete objects that are only partially written or that have been abandoned before completion. A partially written object may not be visible to the client and, as a result, the client will not delete this object. However, it is useful to free the space consumed by these types of objects.

In one example, the deletion bucket 250 corresponds to an in-progress write. Thus, the deletion record 252 is entered into the deletion bucket 250 for the in-progress write. The deletion record 252 is removed from the deletion bucket 250 when the write completes. While the write is in-progress, a time stamp 258 included in the deletion record 252 may be updated. In particular, the time stamp 258 represents a modification time stamp that identifies when the in-progress object was last modified. The time stamp 258 may be updated at intervals while the object is being written such as every ten minutes.

When garbage collection is performed, in-progress objects are cleaned or removed when the timestamp 258 is older than a threshold. In other words, if the in-progress object has not been written to for a threshold period of time, the in-progress object is deleted since it has been abandoned by the client. This may include a process that relies on the object recipe as discussed herein to identify and remove the in-progress object from the object storage bucket 230.

FIG. 4 illustrates an example of a garbage collection operation. In one example, the garbage collection operation is performed in phases. The method may begin with a startup phase 402 in which the controller is instantiated and the workers are allocated or instantiated. Part of the allocating workers may include determining the number of workers needed to perform the garbage collection operation. The startup phase 402 is further illustrated in FIG. 5.

Figure 5:
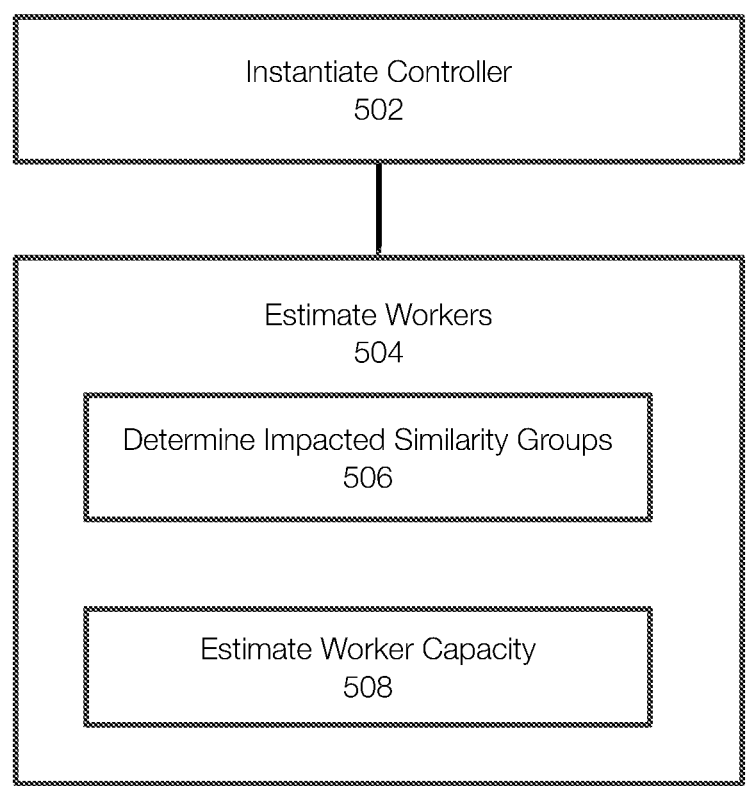
FIG. 5 illustrates an example of a startup phase of a garbage collection operation where the workers and worker capacities are estimated.

FIG. 5 illustrates an example of a startup phase. The startup phase typically begins by initiating or instantiating 502 a controller. For example, when the time for performing a garbage collection operation is reached, a job (e.g., a cron job) is created and the controller is instantiated. The controller may be created within a cluster such as a Kubernetes cluster.

Once the controller is instantiated, the controller estimates 504 the number of workers that are needed to perform the garbage collection operation. Estimating 504 the number of workers may include determining 506 or identifying the similarity groups impacted by the garbage collection operation. This can be determined by evaluating the deletion records. The number of workers is also influenced by estimating 508 the capacity of each of the workers. Further, this estimation can account for various constraints faced by the protection system including memory, input/output (IO), IO operations or throughput Estimating 504 the number of workers can be achieved in various ways. In one example, the number of workers may be set via an environment variable. An environment variable may be useful for testing, debugging and performance comparison purposes. Using an environment variable also aids in evaluating scenarios that may not be considered or anticipated with more complex estimation methods. The environment variable can be updated based on past performance or for other reasons.

As previously stated, the work to be performed may be affected by the number of impacted similarity groups. As a result, the number of impacted similarity groups may be determined 506 when estimating the number of workers to be used.

Figure 6:
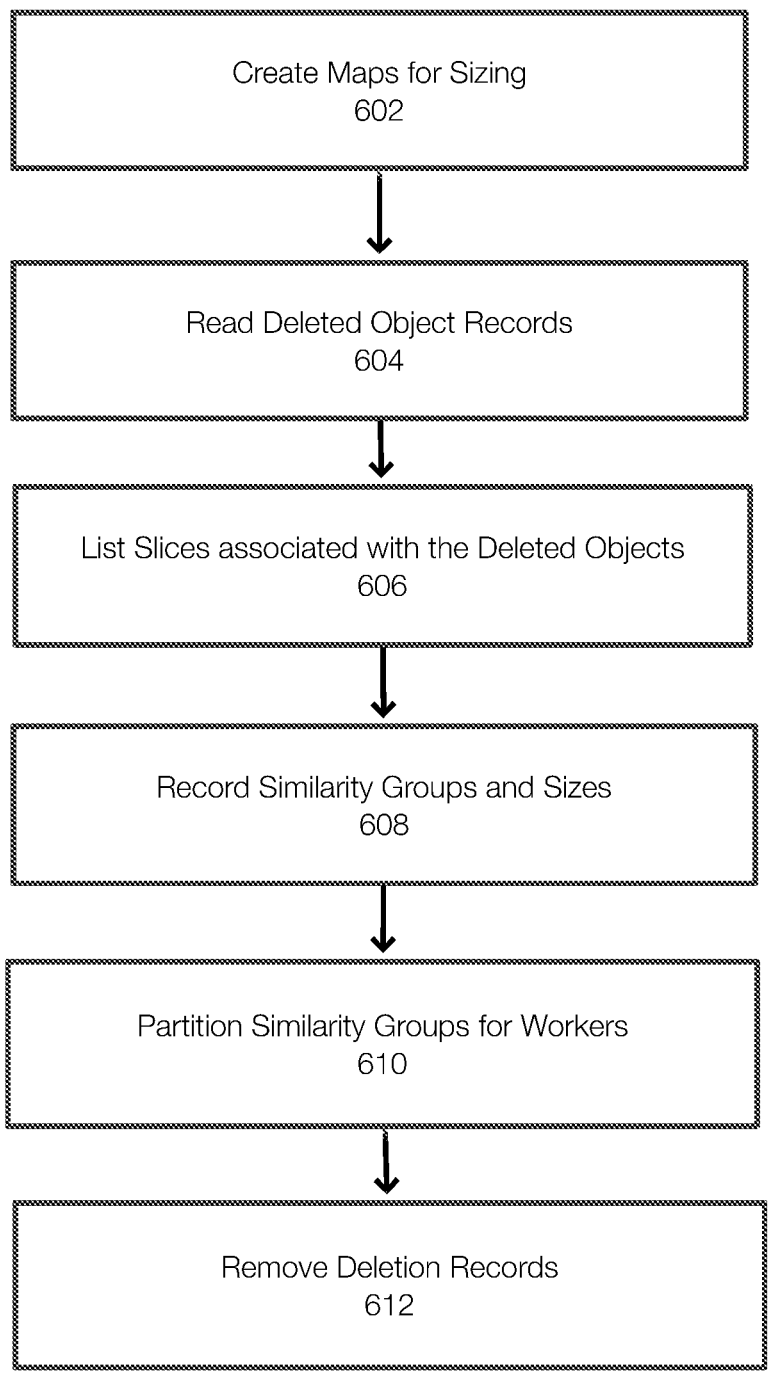
FIG. 6 illustrates an example of a method for estimating a number of workers based on the similarity groups impacted by the garbage collection process.

FIG. 6 illustrates an example of a method estimating the number of workers needed to perform the garbage collection operation. In one example, maps for sizing are created 602. The maps help identify the space or memory that may be needed for a worker to perform garbage collection. In one example, the garbage collection operation is assigned to the workers based on similarity groups—each worker is responsible for a range of similarity groups. However, each range may not be the same. For example, the workers may each be assigned a range of similarity groups to clean based on the sizes of the impacted similarity groups.

The maps may include a similarity group map for each similarity group's subgroups and an overall similarity map to track the overall size of memory needed for all of the impacted similarity groups. After creating the maps, the deleted object records are read 604 from the deletion bucket. The records are parsed or evaluated in order to identify or list 606 the slices associated with the deleted objects in the deletion bucket. The similarity group identifiers can be obtained from the list of slices identified from the deletion records. In one naming convention, the name of each slice recipe includes the name of the similarity group and subgroup that the slice recipe references. The similarity group identifiers obtained from the deletion records may be inserted into the maps and the sizes are calculated. In one implementation, the size of the <similarity group, subgroup> is checked immediately. In another implementation, the similarity group identifier is stored in a map, and a separate listing takes place of all similarity groups and subgroups along with their sizes, and the needed sizes are stored in the maps. Thus, the impacted similarity groups and their sizes are recorded in the similarity group map and the overall similarity map. The size of the map is calculated and used, for example, when distributing work to the workers.

In this example, size refers to the bits needed to represent the impacted similarity groups in memory. Thus, each similarity group and subgroup may be associated with a size. All similarity group's subgroup's sizes are totaled together in the overall map, and the overall total size can be determined. Using the size, each worker can be assigned a range of similarity groups that can be processed effectively. In one embodiment, all subgroups of a similarity group are assigned to the same worker to simplify determining which worker handles which similarity groups and subgroups. The maps may be implemented using, for example, hash tables. The size of each similarity group and subgroup may refer to the size within object storage or the number of bits (or bytes)

needed to represent the similarity group's fingerprints using a hashtable, Bloom filter, or perfect hash vector.

After the similarity groups and their sizes are recorded, the similarity groups can be partitioned 610. For example, overall similarity map may be sorted from the lowest similarity group ID to the highest similarity group ID. The process may iterate through the map and assign similarity group IDs to a worker until the size of the current assigned similarity group is too large for the worker. In this case, the partition ends and a partition is determined for the next worker. The current assignment assigns all subgroups of a similarity group to a worker, and consecutive similarity group identifiers are assigned to a worker, though other assignment techniques are possible. The deletion records can then be removed 612.

The contents of the deletion records may influence the operation of determining the number of impacted similarity groups. For example, if the deletion records contain an object recipe or a name of the object, this would allow the number of impacted slices to be identified and would give an upper bound for the number of impacted similarity groups. This may also reduce the time needed to count the unique similarity groups referenced by the deleted records because listing the slices involves a potentially expensive object storage operation.

In the context of estimating the number of workers for the garbage collection operation, the number of workers may also depend on worker capacity. The capacity may be dependent on memory, IO operations, throughput, and the like. These factors may also be incorporated into the process of determining the number of workers for the garbage collection process.

The memory allocated to the node or nodes on which the workers run may be limited or constrained and may be considered when estimating the number of workers for the garbage collection operation. In this situation, the number of workers can be estimated by estimating the work capacity of a worker based on their memory allocation.

For example, the workers may be constrained by memory. A similarity group references one or more compression regions, which may each have one segment or over 1,000, each approximately 8 KB in size. A similarity group records with each compression region name that it references, the list of fingerprints and segment sizes corresponding to the segments in the compression regions. A worker maintains a record for each fingerprint for each similarity group and subgroup assigned to the worker so it can determine the liveness of each segment referenced from those similarity groups. Similarity group subgroups are currently capped at 8 MB in total size. The work capacity (or number of similarity groups that the worker can process) for each worker can be determined or estimated 508 as follows:

$$\frac{\text{Worker node memory}}{8 \text{ MB}}$$

In a further extension, instead of recording fingerprints in a hashtable for each similarity group and subgroup, the fingerprints may be recorded in a Bloom filter. This reduces the memory requirements from 8 MB per similarity group to approximately 400 KB because a Bloom filter is a compact set membership structure. A perfect hash vector could be used instead of a Bloom filter, which would reduce the memory requirements to approximately 130 KB.

Once both the work capacity per worker and the total number of impacted similarity groups have been calculated, the number of workers needed for the garbage collection operation can be computed as follows:

$$\left[ \frac{\text{Number of Impacted Similarity Groups}}{\text{Number of Similarity Groups each Worker can process}} \right]$$

In a further extension, instead of assuming that all similarity groups are the maximum possible size of 8 MB, the similarity group and subgroup sizes may be determined by the controller in the calculation for the memory necessary to represent the similarity group and subgroup's fingerprints within a worker. This size is modified based on the representation selected, such as a hashtable, Bloom filter, or perfect hash vector. This size is totaled and divided by the amount of memory each worker can have to determine the number of workers to allocate.

In other example, the garbage collection operation or aspects of the protection system may be constrained by IO (input/output operations) and this constraint may also impact the number of workers needed for the garbage collection operation. In this example, the number of workers can be determined in a manner that efficiently or best uses IOs allocated to the worker nodes.

In one example, the IOs allocated to the nodes on which the worker pods run can be combined with the length of time that the garbage collection operation is allowed to run. To estimate the amount of IO operations taking place during a garbage collection operation, the types of IOs that occur in the protection system can be differentiated. For example, there are IO operations associated with printing logs, sending RPC calls between services, and calls to object storage. Amongst these types of IO operations, the latency to the object storage dominates. This allows embodiments of the invention to focus on object storage calls alone to obtain an estimate for total IO operations.

In one example, the number of IO operations needed to clean a single similarity group is estimated or determined. There may be 1 IO operation to read a similarity group, 1 IO operation to write a similarity group, and 1 IO operation to read each compression region. As the compression regions are cleaned, it is possible to assume 2 compression regions read per 1 compression region written. This is a ratio of 2:1 for compression region reads to writes. Next, there are deletion calls to the old compression regions, which are associated with approximately the same as the number of IO operations as the number of compression region reads.

An assumption can be made about the number of compression regions referenced per similarity group. For example, a similarity group can include approximately 8 MB of values that identify slice identifiers. An ~8 MB slice includes about 1024 8 KB segments. Assuming that 50 percent of these segments are removed during deduplication, about 512 segments are entered or written into each compression region. Each compression region referenced from a similarity group has a name and some number of fingerprint references (20 bytes for SHA1 hash and 4 bytes for size). Therefore, each segment fingerprint needs 24 bytes. As a result, a compression region needs approximately 512*24=12,288 bytes in a similarity group. At ~8 MB, a similarity group divided by 12,288 bytes means a similarity group might reference ~683 compression regions. It may also be necessary to account for the slices that are read during the "Mark Live Fingerprints" phase. As an estimate, it is reasonable to assume there is one slice read per compression region.

This information allows the number of IO operations needed to clean a similarity group to be estimated as follows:

> 1 (to read the similarity group)+683 (for compression region reads)+683 (for slice reads)+1 (to write the similarity group)+342 (for compression region writes) +683 (for compression region deletions)+1 (to delete the old similarity groups)=2,394 IO operations After estimating the total IO operations needed to clean a similarity group, it is necessary to count the impacted similarity groups at runtime in order to determine how many IO operations are required to clean all impacted similarity groups. The estimation of the number of IO operations can be adjusted based on the size of the similarity groups and subgroups. Similarity groups and subgroups smaller than the full 8 MB or smaller than the maximum size defined will require fewer IO operations than the example given.

Once the total number of IO operations are determined or estimated, the number of workers can be decided based on the performance characteristics of the worker nodes, which dictate the potential TOPS for that particular node, along with the desired time to complete the garbage collection run. In one example, the IO operations are typically limited by the network card, CPU or processor, and the like. Using an offline analysis in one example, the number of IOPS each instance can support can be determined and is used as an input to the calculation.

With this information, the number of workers can be estimated as follows:

$$\left[ \frac{\text{Total } I/O \text{ operations}}{IOPS \text{ per node} * \text{Time to complete } GC \text{ run in seconds}} \right]$$

In another example, these methods can be adjusted by changing some of the assumptions. In one example, counters can be used that track IO operations during a garbage collection operation. This allows an IO operation count to be updated in a configuration file that may be used during subsequent garbage collection operations. This is an example of a feedback loop that allows the accuracy of the IO operation estimation to be improved based on prior data.

Figure 7:
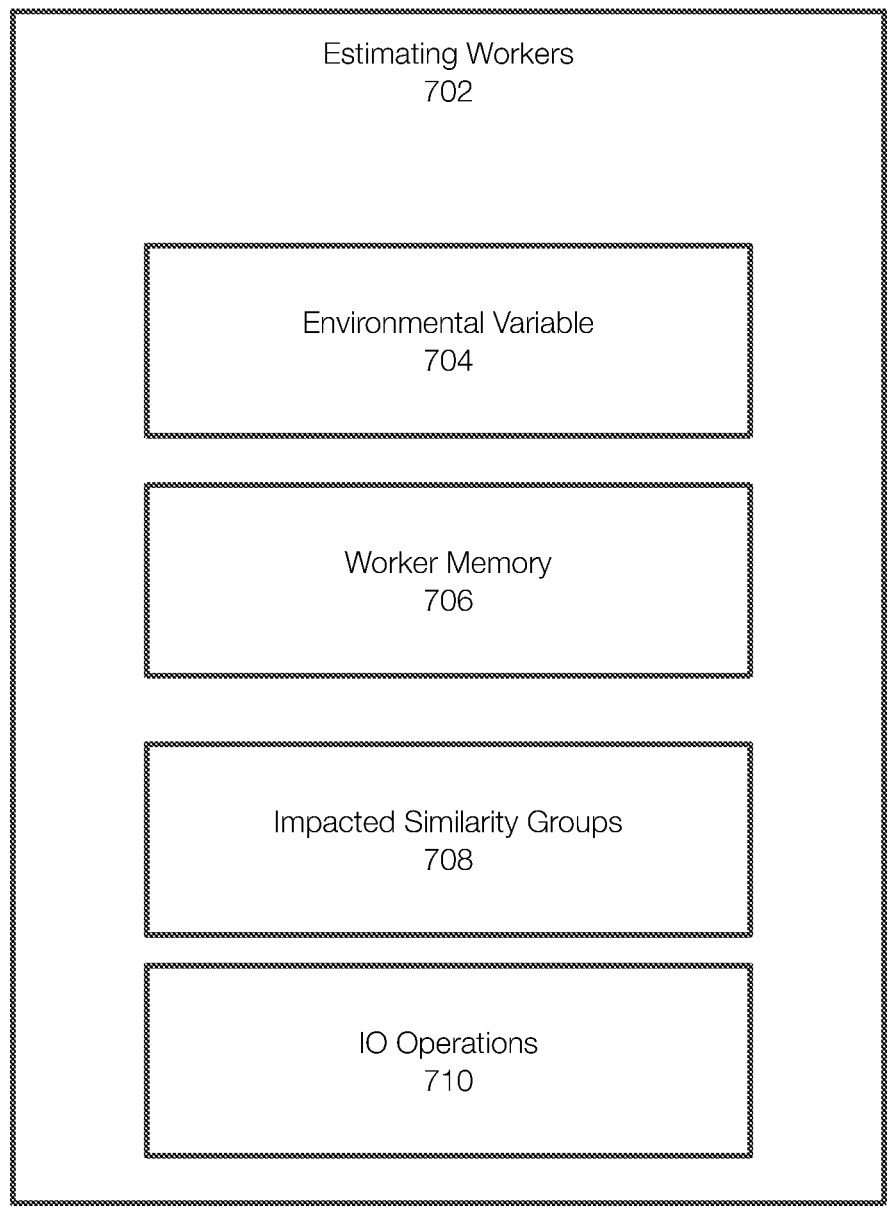
FIG. 7 illustrates an example of factors that may be considered when estimating the number of workers needed for a garbage collection process.

With this information, the number of workers can be estimated and the controller can finish creating the workers. FIG. 7 illustrates examples of factors that may be used in determining or estimating the number of workers. Estimating workers 702 may rely on factors including one or more of an environmental variable 704, worker memory 706, impacted similarity groups 708, and/or IO operations 710.

It should be understood that estimating the number of workers can use one or more of these properties in any combination. In a further example, the number of workers can be calculated using each property and the minimum, average, or maximum number of workers estimated for each property could be allocated.

In one example, the garbage collection operation may focus on cleaning similarity groups and compression regions that are referenced from the similarity groups. Because the similarity groups have an ID in a given range (e.g., 0 to 4 billion), the similarity groups can be split evenly (based on number and/or anticipated sizes) across the workers. The splits may be recorded in a table that is shared between the controller and the workers. The controller and the workers may communicate with each other using, by way of example, RPC (Remote Procedure Calls) calls.

Returning to FIG. 4, the impacted similarity groups may be marked 404 after the startup phase 402. In order to know which data structures to clean from the object storage bucket, the deletion records are analyzed to identify the slice recipes and impacted similarity groups associated with the deletion records. Because similarity groups are associated with slices, identifying the slices allows the associated similarity groups to be marked or identified.

Figure 8A:
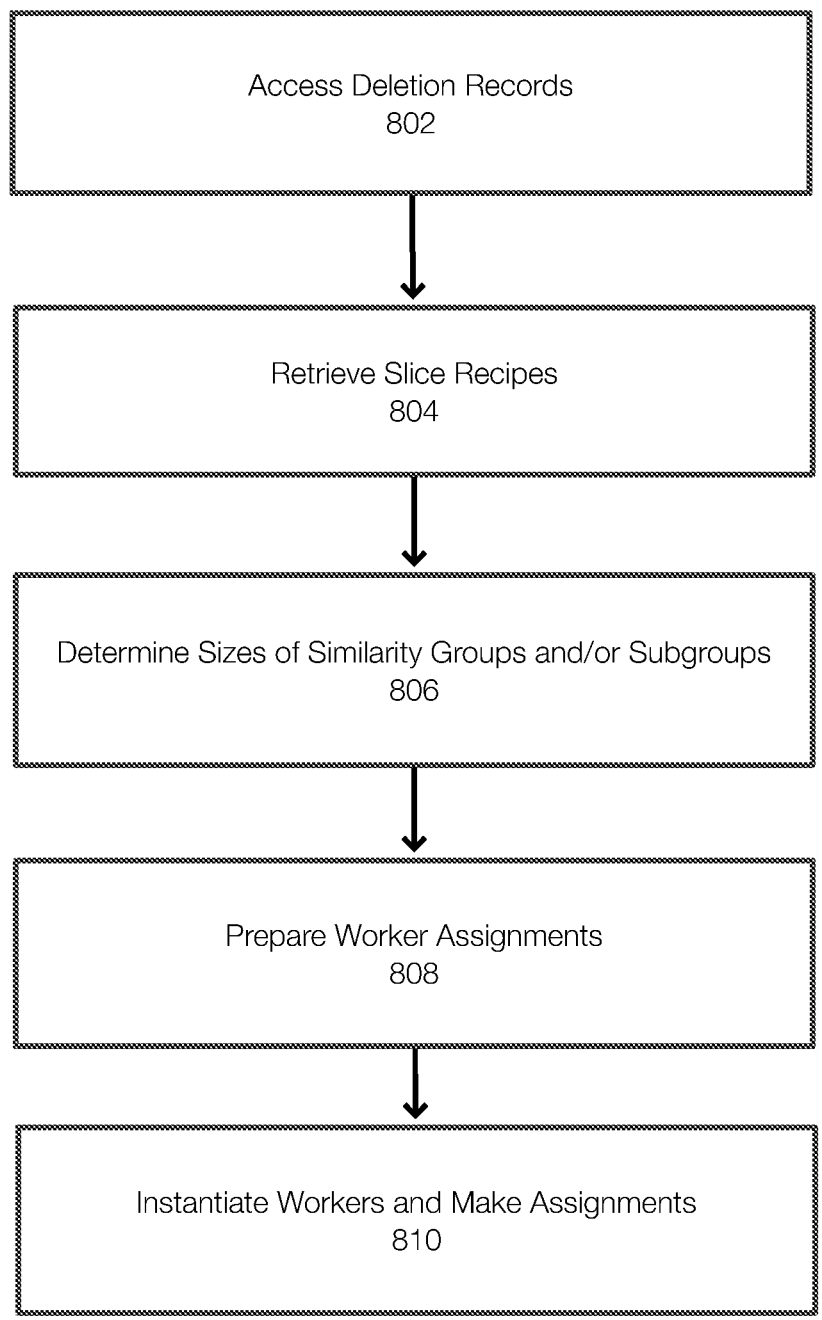
FIGS. 8A and 8B illustrate examples of processing similarity groups, which includes marking impacted similarity groups while performing a garbage collection process.

FIG. 8A illustrates an example of processing similarity groups. In one example after a controller is initiated (and before the workers are instantiated), the controller may evaluate the deletion records in order to identify the impacted similarity groups, determine the sizes of the impacted similarity groups/subgroups, and prepare worker assignments.

FIG. 8A illustrates that a controller accesses 802 the deletion records. The deletion records allow the controller to retrieve or access 804 the slice recipes. Because the slice recipes are each associated with a specific similarity group, the impacted subgroups can be identified and their sizes can be determined 806. The size of each impacted subgroup can be assumed or actually determined. When determining the impacted similarity groups and the sized of the similarity groups and impacted subgroups, various sizes may be stored. The size of each impacted subgroup, the size of an impacted similarity group and the size of all impacted similarity groups may be stored for example.

Based on the sizes and/or the number of impacted similarity groups, the controller can prepare worker assignments 808. In other words, the similarity groups are partitioned and assigned to the workers. These assignments or partitions effectively allocate a grouping of similarity groups to each of the planned workers. In other words, the controller may estimate the number of workers needed and prepare assignments for each of these workers. The similarity groups can be distributed equally, based on sizes such that the number of similarity groups assigned to each worker may vary, or the like. Alternatively, the similarity groups can be distributed so their sizes are approximately equal for each worker.

Next, the workers are instantiated and the assignments are made 810. In this example, the workers may communicate with the controller to obtain their assigned list of similarity groups and subgroups. Based on the associated sizes, the worker can create a mapping structure to track the fingerprints of the segments. This allows the live segments to be identified such that the live segments can be carried forward.

Figure 8B:
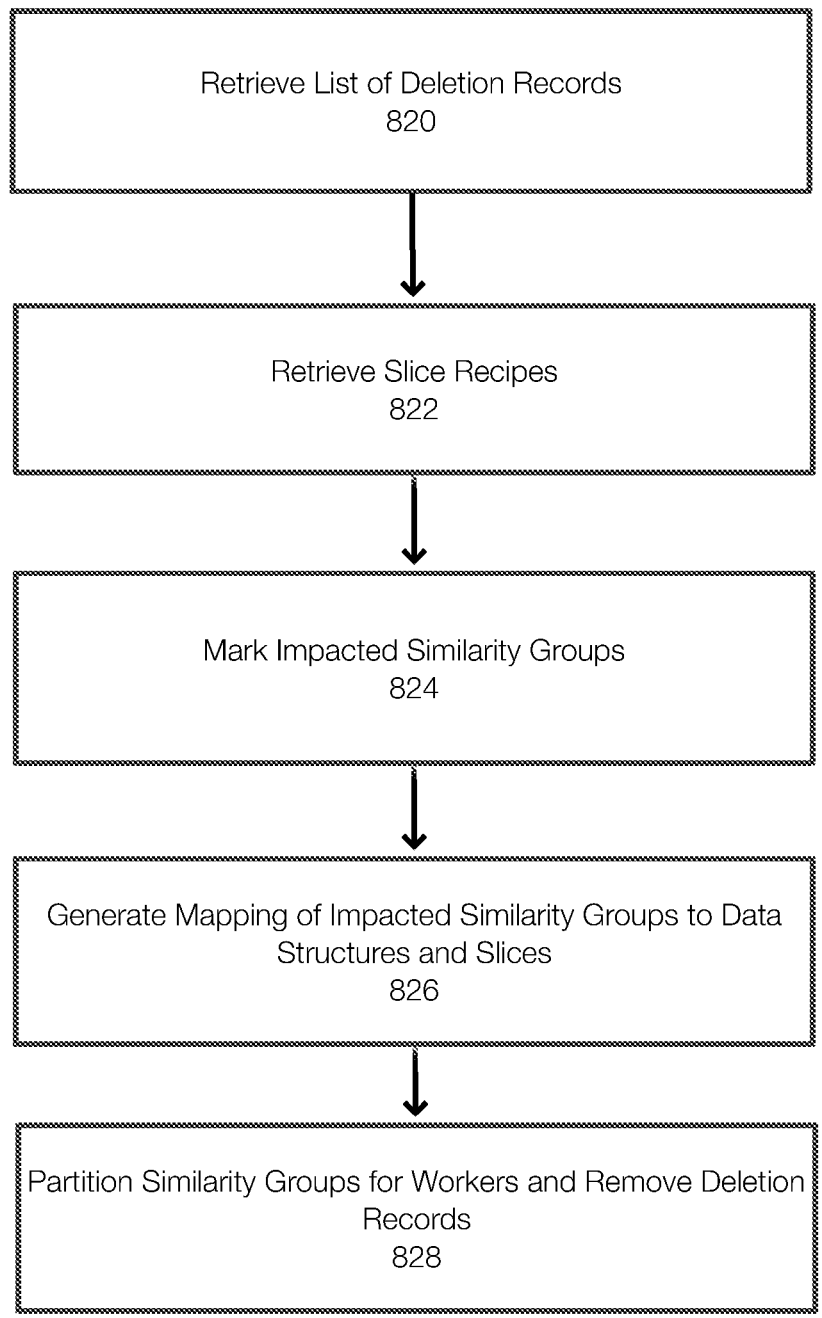

FIG. 8B illustrates another example of identifying or marking impacted similarity groups. The deletion records are retrieved or received 820 (e.g., as a list), for example, by the controller. The controller may then issue a call (e.g., an RPC call) to one of the workers based on their assigned similarity group such that the worker receives at least a portion of the list of deletion records.

The slice recipes are retrieved 822 or listed from the deletion records. The worker then retrieves 822 the slice recipes for the deleted objects and associated similarity groups. The workers are typically responsible for cleaning the slice recipes identified in the deletion records from the object storage. More specifically, the name of each slice recipe includes the similarity groups referenced by each slice recipe.

This allows the worker to mark 824 the similarity group as long as the similarity group falls within the range of similarity groups assigned to the worker. If a similarity group is not within the worker's assigned range of similarity groups, the worker may make a call to an appropriate worker such that the called worker can mark the similarity group.

As part of marking, the similarity groups/subgroups may be mapped and sized 826. In other words, a mapping may be generated that maps the impacted similarity groups to sizes. More specifically, this operation or process results in a mapping of impacted similarity groups to data structures that hold live segments, the number of live slices, and the number of live segments, which are used in subsequent phases including marking live fingerprints 408 and copy forward 410 phases.

Garbage collection can be a time intensive process. As a result, after the similarity groups are marked 404, the impacted similarity groups are write-locked 406 as shown in FIG. 4. Thus, in order to allow clients to conduct normal operations, impacted similarity groups are write-locked. This allows the garbage collection operation to process at the same time as or simultaneously with normal operations.

For example, the garbage collection operation may impact a similarity group that is the subject of a normal write operation. This may result in removing segments that a write operation references or other issues. This is prevented by write-locking impacted similarity groups.

More specifically, to prevent or reduce delays and to allow for concurrent write operations, the similarity groups may include subgroups. Typically, normal write operations are directed to the highest numbered subgroup (e.g., because the other subgroups are full). If the highest numbered subgroup in a similarity group is marked for cleaning, a new subgroup will be added to the similarity group for incoming writes. As a result, no incoming write operations will reference an impacted similarity group and these operations can be performed concurrently.

Figure 9:
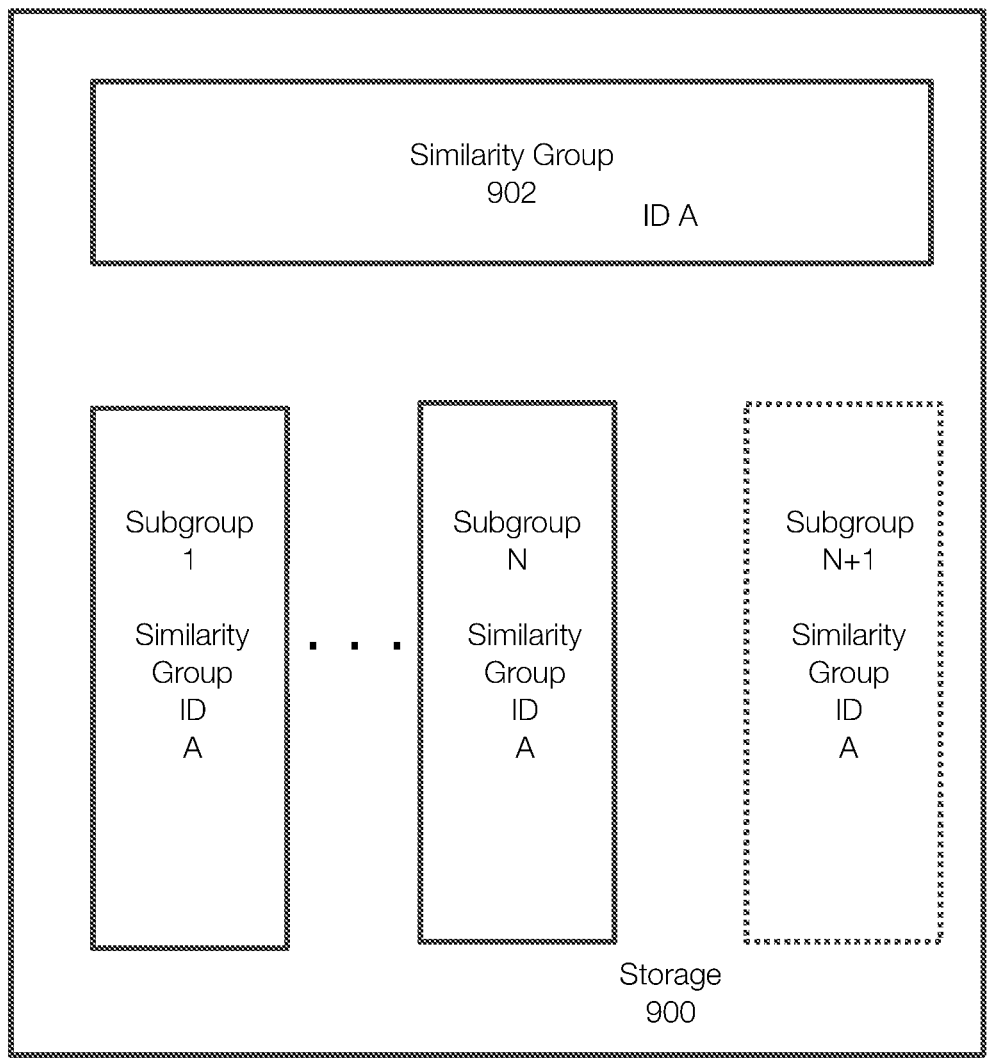
FIG. 9 illustrates an example of a similarity groups and associated subgroups that have the same identifier as the similarity group.

FIG. 9 illustrates an example of related subgroups that are associated with the same similarity group. As illustrated in FIG. 9, each of the subgroups 1, N and N+1 are associated with the same similarity group 902 and each subgroup may be a distinct object. The similarity group 902, which has an ID A, may also be an object in the storage 900. Each of the subgroups 1, N and N+1 have the same similarity group ID A which associated the subgroups to the similarity group 902.

FIG. 9 also illustrates the process of adding a new subgroup when the highest numbered subgroup is impacted by the garbage collection process. In this example, subgroup N is the highest numbered subgroup. If the subgroup N is an impacted subgroup (e.g., is subject to garbage collection), then a new subgroup N+1 is added. This allows the new subgroup N+! to be used for deduplication and allows the subgroup N to be used for reads and to be cleaned. Each subgroup may be stored as a separate object in object storage.

More specifically, each slice of an object is mapped to a similarity group based on a function of the data within the slice. The function typically produces an identifier (ID) between 1 and 4 billion in one example. Slices are typically deduplicated only against the similarity group and highest subgroup with the same similarity group ID. When a subgroup reaches a threshold size (e.g., 8 MB), an empty similarity group is formed with the same similarity group ID but an incremented subgroup ID. Future slices that map to the similarity group are deduplicated against the current subgroup ID. This ensures that new writes will not interfere with impacted similarity groups or subgroups being cleaned by the garbage collection operation.

This may lead to a potential loss in deduplication because subgroups start out empty. However, empty subgroups can be removed because it is safe to deduplicate against a similarity group and/or subgroup once cleaned. Alternatively, deduplication tasks could be performed by the metadata server in order to mark the appropriate fingerprints by communicating with the garbage collection workers.

Figure 10:
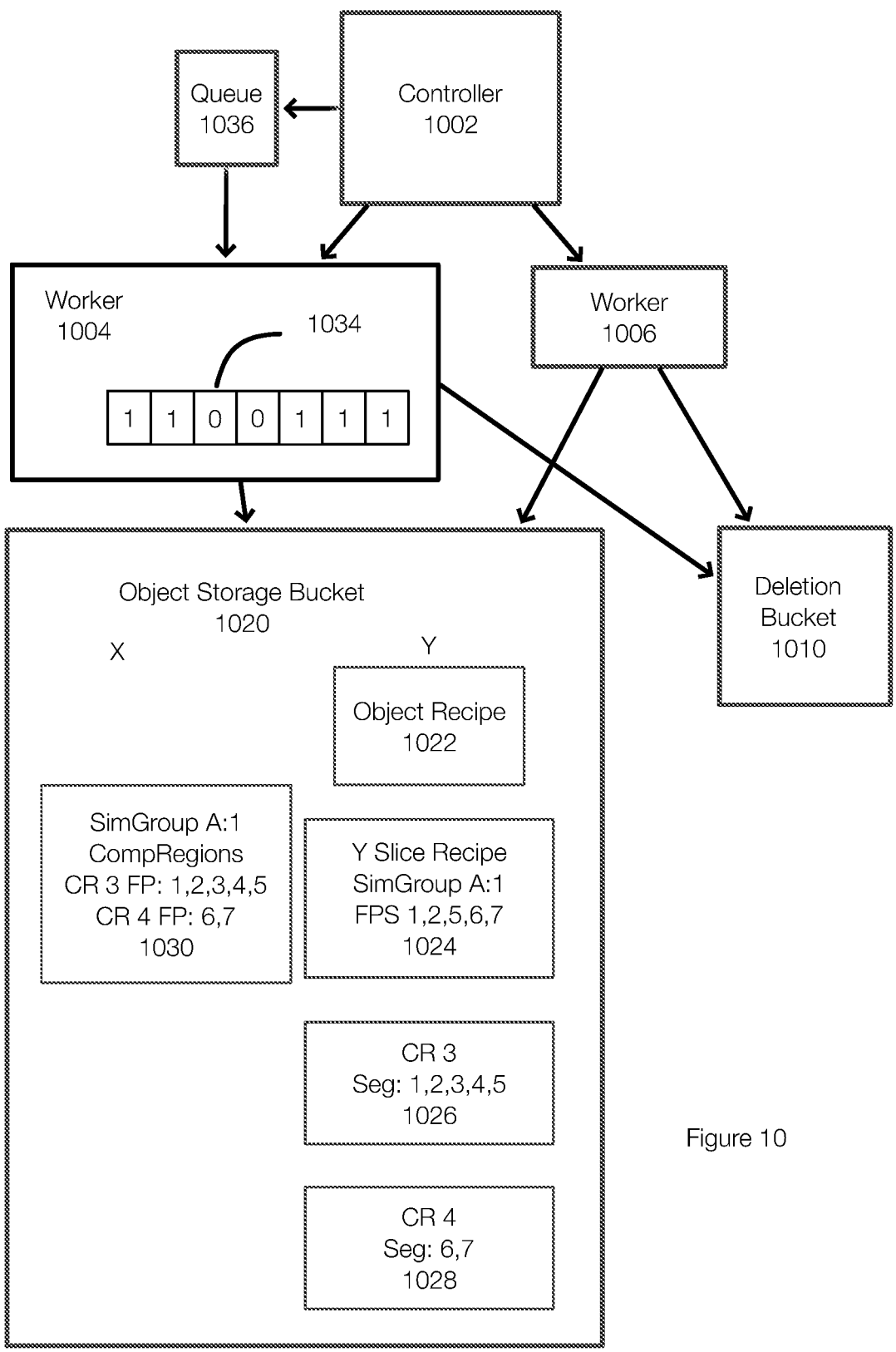
FIG. 10 illustrates an example of marking live segments in preparation for a copy forward phase of the garbage collection process.

Returning to FIG. 4, after impacted similarity groups are locked, live fingerprints are marked 408 in the impacted similarity groups. FIG. 10 illustrates an example of marking live fingerprints. FIG. 10 is also used to illustrate a method for marking live fingerprints.

Initially, the controller 1002 may obtain a list of live slice recipes. This may be achieved by collecting all the deduplication domain identifiers in the storage system. In one example, a deduplication domain identifier is a unique identifier associated with a user. Each object stored in object storage by that user contains a reference to the deduplication domain identifier. New objects are only deduplicated against other objects associated with the same deduplication domain identifier for the sake of tenant isolation, privacy, and security. A user may refer to an entity or organization for example. This information may be obtained from a metadata server as well. Then all object recipes for the deduplication domain identifiers are determined, and from each object recipe, the live slice recipes are listed. After obtaining the list of live slice recipes, the controller may assign the slice recipes to the workers (e.g., the worker 1004 and the worker 1006) based on the previous allocation. For example, the slices assigned to the worker 1004 are those that correspond to the similarity group range assigned to the worker 1004 by the controller 1002.

More specifically, the controller 1002 may parse or analyze the slice recipe name to determine the similarity group ID and subgroup ID. With the similarity group ID and subgroup ID, the controller 1002 looks in its worker table to identify the worker whose assigned similarity group range contains the determined similarity group ID. The slice is then pushed into the worker's live slice channel 1036 (e.g., a queue). Each worker has its own live slice channel and this mapping is managed by the controller using the worker's IP address. Once the controller finishes going through all the live slice recipes and pushing the live slice recipes to their respective worker channel, the controller may close all the worker channels.

Meanwhile, the worker 1004 (and the other workers) makes calls to the controller 1002 and takes a batch of slice recipes from the channel 1036 that the controller 1002 put live slice recipes in. The worker 1004 will continue to pull the live slice recipes in batches from the channel 1036 until the channel is empty. With the list of live slice recipes, the worker 1004 determines the similarity group ID. With the similarity group ID, the worker 1004 checks if the similarity group is marked for cleaning or is an impacted similarity group. If the similarity group is marked, the worker 1004 reads the associated slice recipe and records the list of live fingerprints in an internal live segment structure 1034, such as a bloom filter. This live segment structure 1034 may be configured to contain information such as the number of live slices, the number of live segments, and a list of which segments are live. To reduce memory requirements, the list of segments may be represented in a hash table, Bloom filter, or perfect hash vector. The worker 1004 may maintain a list of segment structures for each impacted similarity group the worker is responsible for. After all the workers have gone through their lists of live slice recipes, each live segment structure has been fully updated.

FIG. 10 illustrates the protection system in the phase of marking the live segments. For example, the object X may be formed from segments 1, 2, 3, 4 and 5. The object X may have been deleted as illustrated in FIG. 3. FIG. 10 illustrates that, in the object storage 1020, the impacted similarity group includes similarity group A, subgroup 1. If this is the highest subgroup, a new subgroup 2 would be created during the garbage collection operation as previously described.

The similarity group A is associated with compression regions (CR) including CR 3, which includes fingerprints 1, 2, 3, 4, 5 and the corresponding segments, and CR 4, which includes fingerprints 6, 7 and the corresponding segments.

The object Y has not been deleted and the object storage 1020 includes the object recipe 1022 and Y's slice recipe 1024, which identifies the similarity group A, subgroup 1 and fingerprints 1, 2, 5, 6 and 7.

Thus, both object X and object Y share segments 1 and 2. CR 3 includes segments 1, 2, 3, 4 and 5 and CR 4 includes segments 6, 7.

When the worker 1004 retrieves a slice recipe from the controller 1002, the worker determines if the slice recipe references an impacted similarity group. If not, the slice is skipped. If so, the slice recipe is read and live fingerprints are marked in the similarity group.

Thus, when the recipe for the object Y is received, fingerprints or segments 1, 2, and 5 in CR 3 are marked and segments 6 and 7 in CR 4 are marked. This is reflected in the structure 1034 where segments 1, 2, 5, 6 and 7 are marked as live.

With reference to FIG. 4, the copy forward 410 phase can proceed after the live segments are marked. Copy forward is a phase that ensures that no unreferenced structures or segments are left in the object storage. This advantageously reduces storage costs. At the same time, there may be situations where some structures are not cleaned based, for example on the ratio of live segments to dead segments.

In one example, the worker 1004 processes its list of slices and corresponding impacted similarity group. Each similarity group is associated with a mapping of live segments for each similarity group. Thus, the structure 1034 is a mapping for the similarity group A. For each similarity group, the referenced compression regions are read and a determination is made as to whether they are sufficiently dead to clean or should be left in their current state. While reading the compression regions of the segment fingerprints, a mapping from compression region name to number of live fingerprints may be created. Determining whether each compression region should be cleaned is performed by calculating the percentage of the compression region that is live based on the number of live fingerprints and comparing that percentage with a predefined threshold (e.g., 85% or other number) that would be considered sufficiently live within the compression region. If the percentage of live fingerprints in the compression region drops below the predefined threshold, the compression region is considered worth cleaning. The threshold may be adjusted to prioritize space reclamation or minimize IO costs.

For each compression region being cleaned, the live segments are copied to form new compression regions. Once all of the new compression regions are formed and recorded in a new version of the similarity group, the new version of the similarity group is stored. The metadata service is alerted to evict the old similarity groups and add the new similarity group. Finally, the old similarity groups and compression regions are deleted. This removes the dead segments from the object storage.

The garbage collection operation may be implemented as a partial or delayed mark and sweep operation. The garbage collection operation includes cleaning or removing deleted objects from the live objects. When an object is deleted, a record is recorded in a deletion bucket (or other structure). The records in the deletion bucket are later used whenever the garbage collection operation is performed. The garbage collection operation may operate in phases or in successive steps of acts. Embodiments of the invention are a focused mark and sweep garbage collection that focuses on similarity groups that may include, at least partially, dead segments.

Figure 11A:
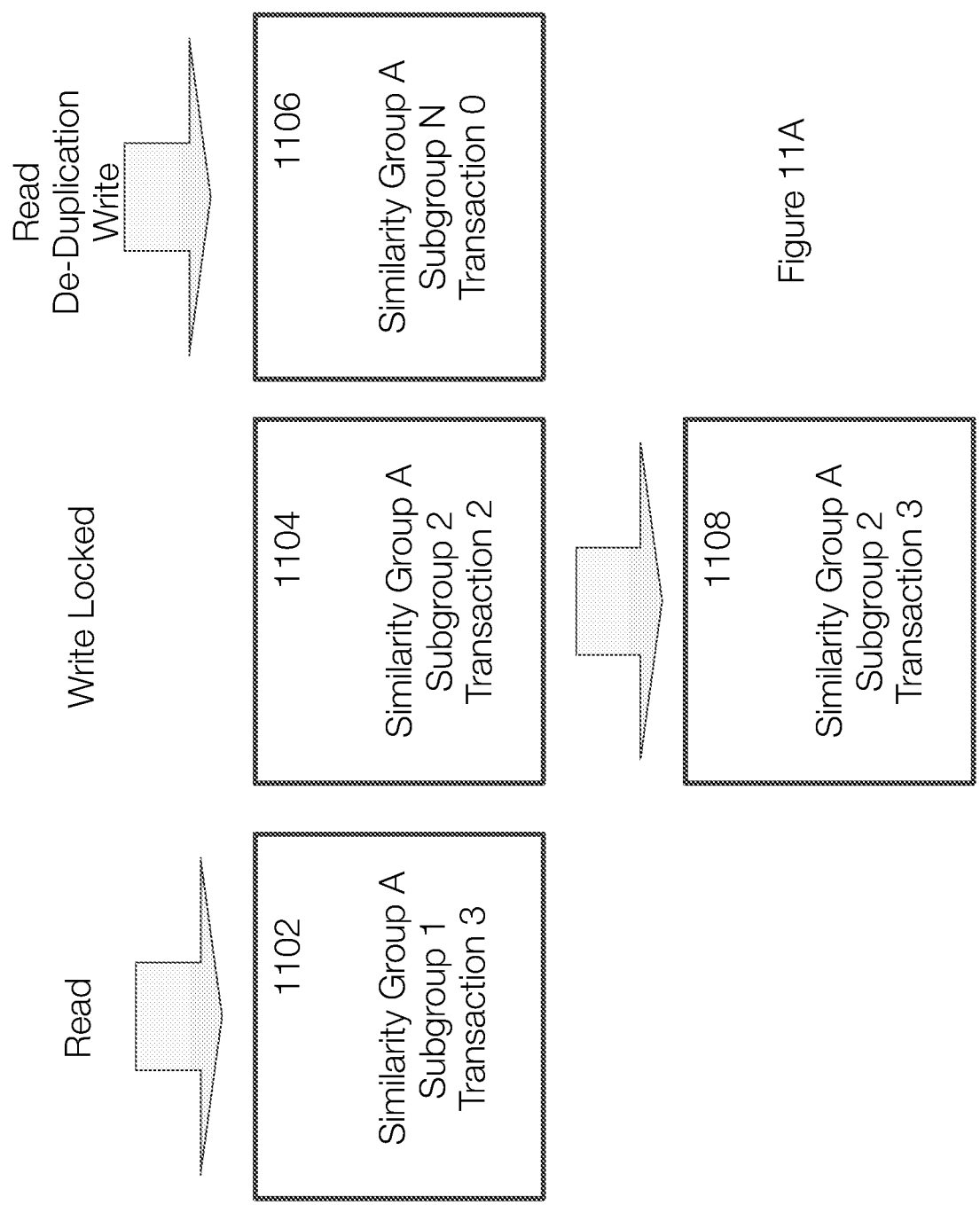
FIGS. 11A-11C illustrates systems and methods for concurrently performing garbage collection operations and normal system operations.
Figure 11B:
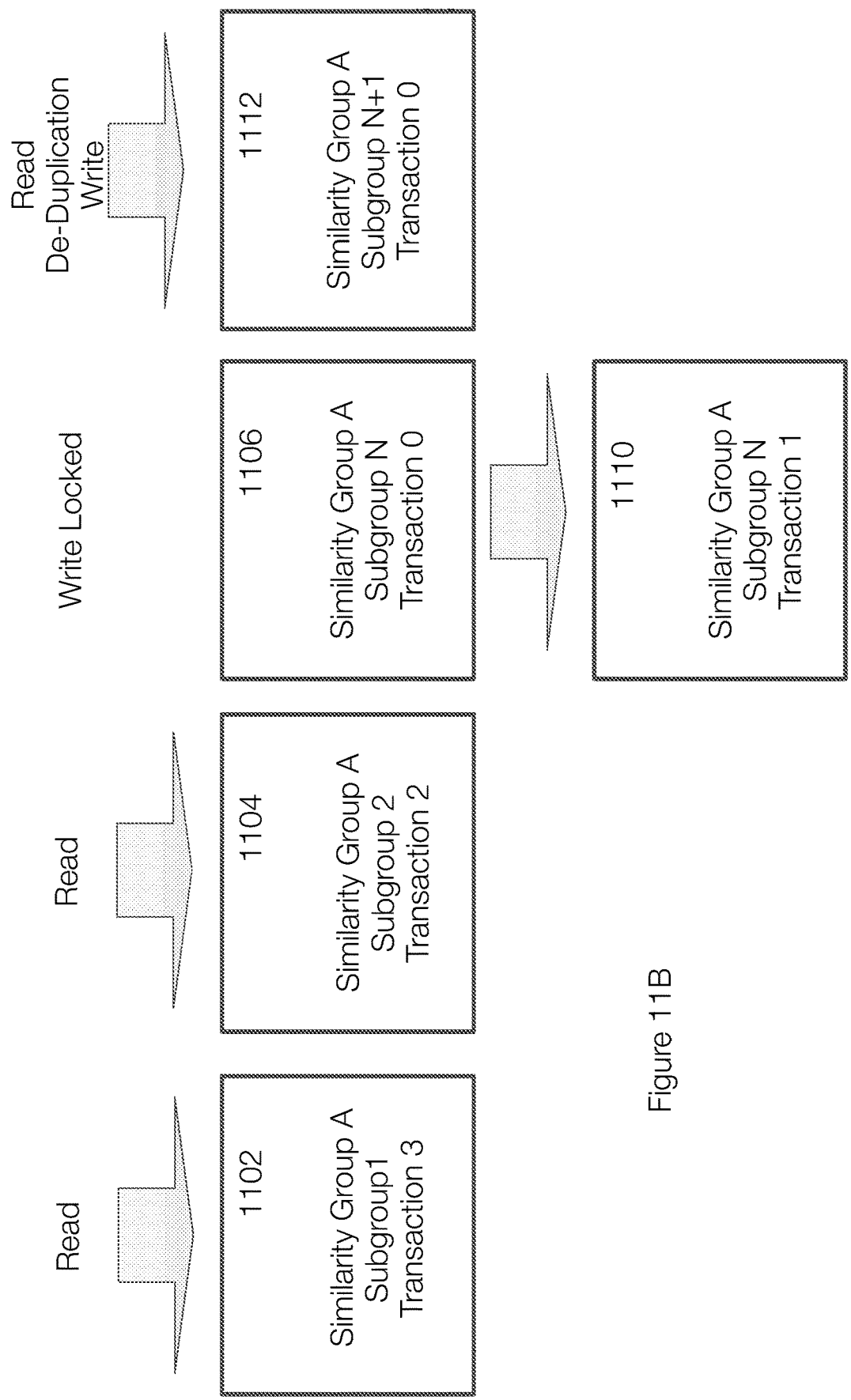

FIGS. 11A and 11B illustrate examples of performing garbage collection and normal system operations simultaneously. As previously discussed, a similarity group may be associated with multiple subgroups. The number of subgroups in a similarity group can change over time. Subgroups can be added, for example. Each subgroup may be associated with information that identifies the similarity group, the subgroup, and a transaction identifier.

FIG. 11A illustrates N subgroups, represented as subgroups 1102 (subgroup 1), 1104 (subgroup 2) and 1106 (subgroup N), that are associated with the same similarity group. The subgroup 1102 is identified as follows: similarity group A, subgroup 1, transaction 3. The subgroup 1104 is identified as follows: similarity group A, subgroup 2, transaction 2. The similarity group 1106 is identified as follows: similarity group A, subgroup N, transaction 0.

In this example, each of the subgroups has a different subgroup identifier. Over time, subgroups may be added. Subgroups may be added for various reasons including when performing garbage collection and when performing normal operations (e.g., a new subgroup is needed when the most recent subgroup is full). When a new subgroup is added, the new subgroup is associated with the same similarity group identifier (e.g., similarity group A), a different subgroup identifier (e.g., N+1) and a transaction identifier. The transaction identifier, in one example, may identify a number of times that a subgroup has been modified or cleaned.

Subgroups are often used for deduplication purposes, which is an example of a normal system operation. In addition, subgroups may be read during normal operations for various reasons such as when reconstituting a data object from its pieces. Embodiments of the invention allow processes such as garbage collection and normal operations to occur at the same time.

FIG. 11A illustrates an example of garbage collection operations and normal operations when the subgroup being cleaned is not the most recent subgroup (i.e., does not have the highest sub group identifier). In this example, the subgroup 1104: similarity group A subgroup 2 has been marked for cleaning.

When a subgroup or a similarity group is identified for cleaning or for garbage collection, the similarity group or subgroup may be marked in a table, map or the like. As part of the garbage collection process for the subgroup 1104, a new subgroup 1108 is created. The new subgroup 1108 has some of the same segment references as the old subgroup 1104. Thus, the subgroup 1108 is identified as follows: similarity group A, subgroup 2 and transaction 3.

More specifically, the new subgroup 1108 has the same similarity group identifier and the same subgroup identifier as the subgroup 1104 being cleaned. The transaction identifier is different and may be used during the garbage collection process. References to live segments from the subgroup 1104 (or from one or more compression regions) are carried forward or copied to the subgroup 1108. Dead or unreferenced segments are not copied to the subgroup 1108.

When the subgroup 1104 is subsequently deleted, all of the dead segments are also deleted. The transaction identifier is used to determine which of the subgroups 1104 and 1108 to delete because they have the same similarity group identifier and the same subgroup identifier. In this example, the subgroup with the highest transaction identifier remains.

This aspect of garbage collection is further described with reference to FIG. 1B. As previously stated, a subgroup may be associated with multiple compression regions. Each compression region stores a number of segments and segment identifiers. As a result, the process of copying live segments can be performed on the basis of compression regions rather than the entire subgroup (although an entire subgroup could be processed in a similar manner). As illustrated in FIG. 1B for a specific compression region, segments 82 and segments 86 are copied forward from the compression region 80 to the new compression region 88. Once the live segments have been copied to the new compression region, the old compression region (e.g., compression region 80) can be deleted in its entirety. Thus, dead or unreferenced segments are removed from storage by creating new compression regions that only include the live segments from the previous compression region. Once this process is performed for all impacted compression regions and the new compression regions are created, the previous compression regions that were partially or fully dead can be removed. As a result of this process, the subgroup 1108 may reference a combination of existing compression regions (e.g., those compression regions that were not impacted by garbage collection) and new compression regions.

While the subgroup 1104 is being cleaned or during garbage collection, other subgroups are available for normal operations. Thus, the subgroup 1102 is available for operations such as read operations. Deduplication, another example of a normal system operation, is often performed only with respect to the most recent subgroup. Thus, only the most recent subgroup (or the subgroup with the highest subgroup identifier) is used for deduplication in one example. Consequently, the subgroup 1106 may be used for operations such as read operations, write operations, and deduplication operations. In FIG. 11A, only the subgroup N is used for writes. Stated differently, the subgroup 1104 is write locked even though the subgroup 1104 may be available for read or other operations.

In addition, the subgroup 1104 is always available for read operations. The updates are ordered such that the subgroup 1104 (or 1108) is always available for read operations. Updates or garbage collection may occur as follows: write out new compression regions, write out subgroup 1108 (such that the subgroup 1108 is associated with the new compression regions and the compression regions that were not cleaned), remove dead compression regions (the compression regions that were cleaned), and then remove subgroup 1104. This allows a client to read data by accessing the subgroup 1104 and its compression regions or by accessing subgroup 1108 and its compression regions.

If a client is in the process of accessing the subgroup 1104 and its compression regions during garbage collection, a read may internally fail. However, the read is retried and results in a read operation that accesses the subgroup 1108. This internal read fail may be hidden from the requesting client.

As a result, the data objects stored in the system and in the similarity group A can be subject to both garbage collection operations and normal system operations at the same time.

FIG. 11B illustrates performing both garbage collection operations and normal system operations when the most recent subgroup (subgroup 1106 or subgroup N) is subject to garbage collection. In FIG. 11B, the subgroup 1106 is subject to garbage collection. As a result, a new subgroup 1112 is created and the subgroup 1106 is write locked. The new subgroup 1112 is identified as follows: similarity group A, subgroup N+1, transaction 0.

Because a new subgroup 1112 has been created, deduplication operations and write operations are now performed with respect to the subgroup 1112. This allows normal write and deduplication operations to be performed with respect to the similarity group A.

The subgroup 1106 is then cleaned as previously described. During cleaning or during garbage collection, the subgroup 1110 is created to effectively replace the subgroup 1106. The subgroup 1110 has the same similarity group identifier and the same subgroup identifier as the subgroup 1106. The transaction identifier of the subgroup 1110 is different.

As the subgroup 1106 is cleaned and the subgroup 1110 is created to take its place, normal system operations may be performed using the similarity group A. Thus, the subgroups 1102, 1104, 1106 and/or 1112 may be used for read operations. The subgroup 1112 may also be used for write and/or deduplication operations. Over time, the sizes of the subgroups may decrease because dead segments are being garbage collected or removed. This reduces storage requirements.

Write locking a subgroup may be achieved implicitly by the system. More specifically, by way of example and not limitation, deduplication may be performed with regard to the most recent subgroup. Thus, other subgroups are not used for deduplication and there may be no need to write to those subgroups. Rather, they are used for read operations. Alternatively, the system may actively ensure that writes do not occur to certain objects such as a particular subgroup. An active lock may be maintained during certain aspects of the garbage collection process, such as when a new subgroup is formed, when live segments are copied into the new subgroup, or the like.

Figure 11C:
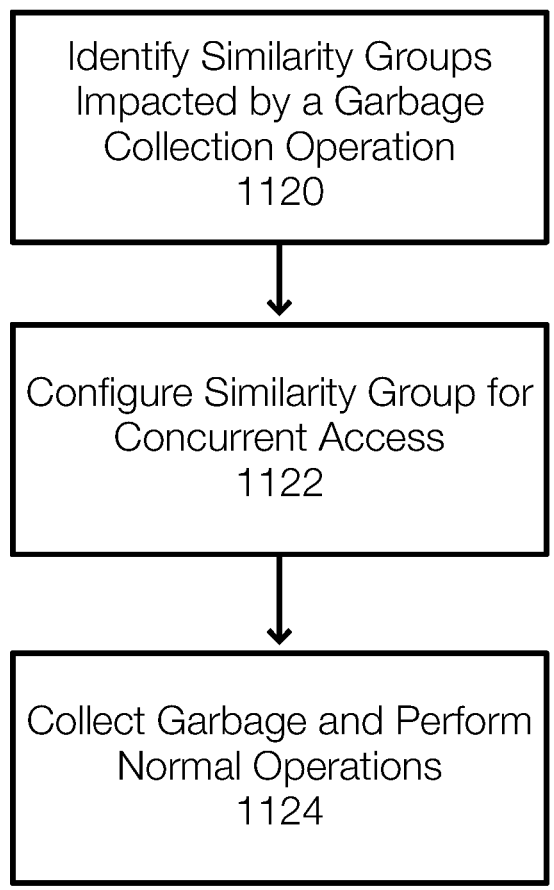

FIG. 11C illustrates an example of a method for performing normal operations and garbage collection operations concurrently. The method may begin by identifying 1120 similarity groups impacted by a garbage collection operation. This may include identifying specific subgroups in the impacted similarity groups.

Next, the similarity group is configured 1122 for concurrent access. This may include write locking a subgroup as necessary. Configuring the similarity group may also include creating a new subgroup when the impacted subgroup is currently used for deduplication. Then, garbage collection operations and normal operations are performed 1124 concurrently. This may include allowing the system to perform reads, writes, deduplication, or the like using the similarity group while collecting garbage in the similarity group.

Figure 12A:
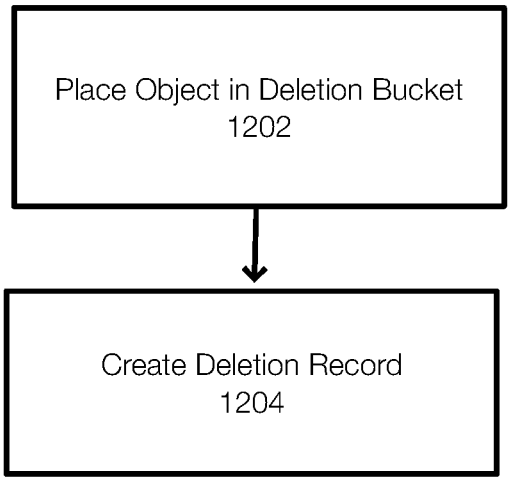
FIGS. 12A and 12B illustrates an example of a method for deleting an object or objects from a storage system such as a deduplicated storage system.
Figure 12B:
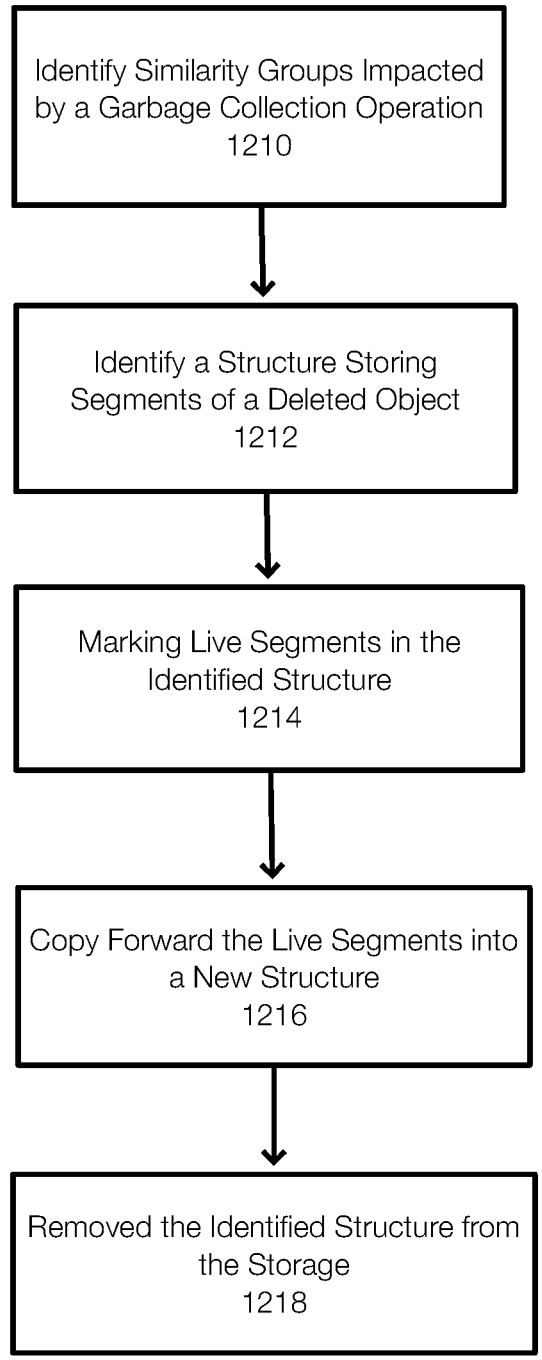

FIGS. 12A and 12B (FIG. 12) illustrate an example of a method for deleting an object or objects from a storage system such as a deduplicated storage system. Because the deletion of an object can occur in phases, FIG. 12A illustrates a first phase of the method for deleting an object and FIG. 12B illustrates a second phase for deleting an object.

As previously stated, the process of deleting an object in a deduplicated storage system is not trivial at least because objects are typically divided into pieces (e.g., segments). As a result, a segment stored in the storage system may correspond to both a live data object and a dead object. FIG. 12 illustrates an example of a method for deleting segments that are completely dead or that are not referenced by any live object or live object recipe in the deduplicated storage system.

With reference to FIGS. 2 and 3, the process of deleting an object begins as shown in FIG. 12A. An object is placed 1202 in a deletion bucket and a deletion record is created 1204 for the object. Placing an object in the deletion bucket typically occurs in response to an action. For example, an object may expire according to a policy for example. Backups are often kept for a limited time period and when that time period expires, the backup and associated objects may be deleted. This results in placing objects in the deletion bucket. A specific object or group of objects may be placed in the deletion bucket by a user or client that actively deletes the specific object or group of objects.

Objects may be temporarily placed in the deletion object when the objects are being written. Objects that are not completed remain in the deletion bucket while objects that are completed may be removed from the deletion bucket.

Closely associated with placing an object in the deletion bucket is the creation of a deletion record as 1204. When a deletion record is created, sufficient information is included such that the segments of the object may be identified. This may include the object's recipe, a name of the object, or the like. When an object is placed in the deletion bucket and a deletion record is created, the object is no longer viewable from a client's perspective.

Over time, a number of deletion records may accumulate in the deletion bucket. More specifically, the process of actually removing the objects that have been placed in the deletion bucket is complicated, as previously stated, due to the deduplicated nature of the storage system. The actual removal or deletion of the objects may occur at a later time such as according to a schedule, based on the number of deletion records, based on an explicit command, or the like.

FIG. 12B thus illustrates a process or a second phase of the deletion process. In this phase, similarity groups impacted by a garbage collection operation are identified 1210. Identifying 1210 the impacted similarity groups may include retrieving the deletion records from the deletion bucket. The deletion records, which may include a recipe, allow the objects slices to be identified. Because each slice corresponds to a similarity group, the similarity groups impacted by the garbage collection process can be identified.

Once the similarity group is identified for an object, a structure that actually stores the segments of the object may be identified 1212. For example, compression regions actually store the segments and compression regions are stored in subgroups. Using the slice recipe, the subgroups of the similarity group impacted by the garbage collection process can be identified. In fact, the specific compression regions can also be identified from the slice recipes.

Because a segment may correspond to both a live object and a dead object, FIG. 12B illustrates that live segments in the identified structures are marked 1214 or identified. Thus, the live segments in the similarity group are identified and this may include identifying the live segments in the impacted subgroups and more specifically in the impacted compression regions. The live segments can be identified based on an analysis of live objects in the storage system. Processing the object and slice recipes of live objects is performed and whenever a live object is associated with a similarity group that is impacted by the garbage collection process, the live segments in that similarity group are identified or marked.

Once the live segments are marked, any unmarked segments are dead segments at least because they are not referenced by any live object in the storage system. Next, the live segments are carried forward 1216 into a new structure, as described in FIGS. 11A-11C. Finally, the old structures from which the live segments were copied can be removed 1218 in their entirety.

In some examples, an impacted structure may not actually be processed when the percentage of live segments is above a threshold level. This may reduce costs associated with computing resources. The threshold level may be configurable and may be changed based on storage requirements, cost requirements, or the like. By deleting segments in this manner, deduplication can be preserved and in an active state while also managing the amount of storage space consumed by the objects. This allows both computing resources and storage resources to be managed in a cost efficient manner.

Figure 13:
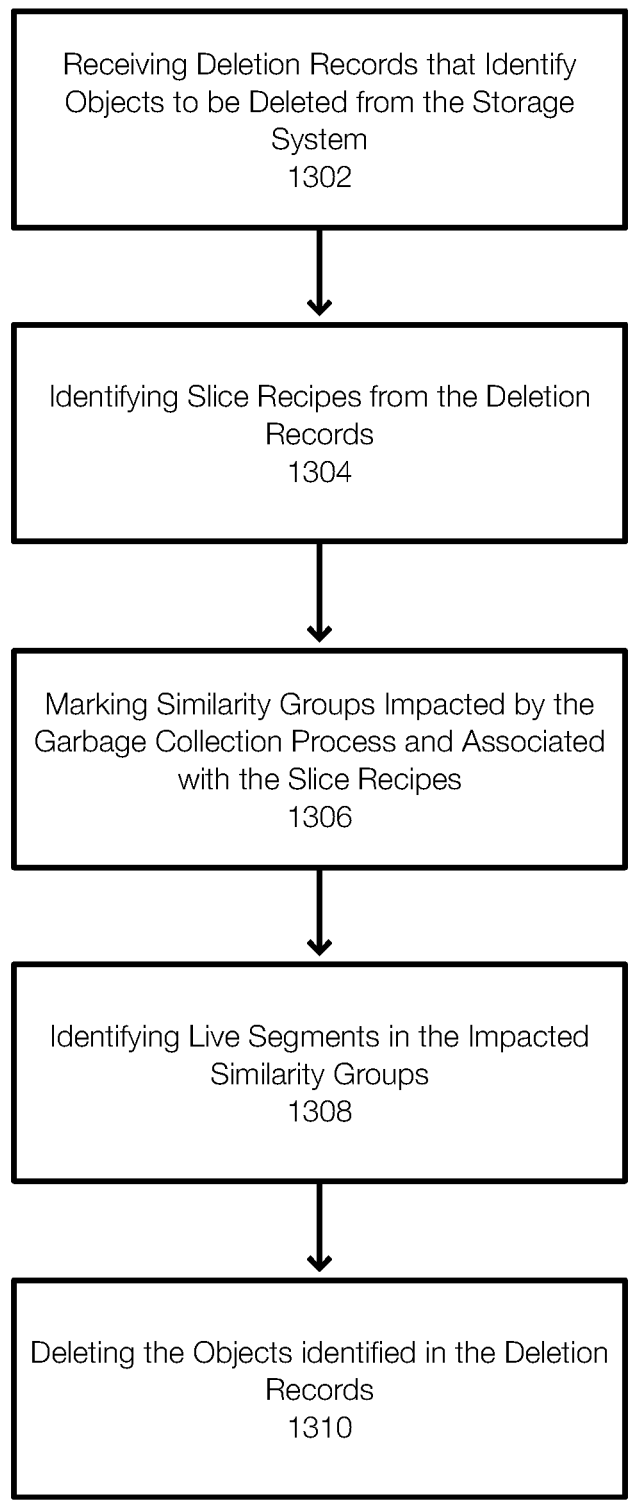
FIG. 13 illustrates an example of a method for marking similarity groups or, more specifically, marking or identifying segments to retain in the storage system and segments to remove from the storage system.

FIG. 13 illustrates an example of a method for marking similarity groups or, more specifically, marking or identifying segments to retain in the storage system and segments to remove from the storage system. When performing garbage collection in a partial or delayed mark and sweep manner, only the similarity groups impacted by the garbage collection process are cleaned. More specifically, only impacted compression regions (the structures actually storing the segments) are cleaned. Cleaning all of the similarity groups in a full mark and sweep operation would take substantially longer.

Marking the impacted similarity groups is a way to identify the similarity groups that need to be processed. The method of FIG. 13 thus begins this process of marking or identifying the impacted similarity groups by receiving 1302 or retrieving deletion records from a deletion bucket. The deletion records, as previously stated, identify the objects that are to be deleted from the storage system. These objects may be referred to as deleted objects even when they may still exist in the storage system until the impacted structures are cleaned.

Each deletion record is processed in order to identify 1304 slice recipes. The deletion record of an object may identify an object recipe and the slice recipes can be determined from the object recipe. Each slice recipe is associated with a similarity group. A single similarity group can be associated with multiple slice recipes. If an object is associated with two slice recipes, then the garbage collection operation for that object will impact one or two similarity groups when that object is subject to deletion.

Thus, the similarity groups impacted by the garbage collection process and associated with the slice recipes are marked 1306. The deletion records allow the garbage collection process to identify which similarity groups will be impacted. In fact, the object recipe allows the subgroups and specific compression regions to be identified or marked. As a result, all of the compression regions impacted by the garbage collection process and associated with the deletion records currently being processed can be determined.

In one example, all compression regions referenced by marked similarity groups are considered for cleaning. Compression regions referenced by non-marked similarity groups will not be considered for cleaning. In addition, there may be many compression regions in a marked similarity group that are not referenced by a deletion record. Embodiments of the invention may or may not clean compression regions that are not referenced by a deletion record. As a result, the garbage collection process may process compression regions that do not store any segments associated with the deleted objects. This could be achieved using a mapping structure to further mark impacted compression regions rather than simply identifying impacted similarity groups. In one example, it may also be possible to skip from the perspective of subgroups. If a subgroup does not contain any impacted compression regions, the entire subgroup may be skipped.

This information, however, is typically insufficient to perform the garbage collection operation in the deduplicated system because some of the segments that are associated with the objects to be deleted may also be associated with live objects.

Thus, the live segments in the impacted similarity groups or in the impacted subgroups and compression regions are identified 1308. Identifying live segments may begin by processing all of the live objects (or live object recipes) in the computing system in order to identify the live objects that are associated with the impacted similarity groups.

For example, an object recipe of a live object may be evaluated. If a slice recipe of a live object does not correspond to an impacted similarity group, the slice recipe can be skipped and the next slice recipe evaluated. The live objects that may be impacted by the garbage collection process are also identified. Identifying the live objects or the live segments ensures that a segment that is live with respect to one object and dead with respect to another object will not be deleted and that the live objects will not be corrupted in the deduplicated storage system.

Once the live objects impacted by the garbage collection process are identified, the segments of the live objects are marked. As shown in FIG. 10, for example, a live segment structure may be maintained for a similarity group (or for a subgroup and/or a compression region). The live segments are identified and marked in this structure. In one example, the similarity groups or the compression regions are mapped to a structure that identifies which of the segments are live. A compression region may be associated with a bitmap (one bit for each segment in the compression region). Live segments can be marked in the bitmap. Unmarked segments in the map are dead segments. Impacted similarity groups can be marked in a similar manner using a map structure that corresponds to similarity structures.

Once all of the impacted live objects have been processed and the corresponding live segments have been identified, the unmarked segments should correspond to the objects being deleted and are otherwise unreferenced by any other live objects.

In one example, the element of identifying 1308 in the impacted similarity groups can be allocated to workers. The live objects can be divided up between the workers such that the live objects are effectively evaluated in parallel. Similarly, the process of cleaning the impacted similarity groups can be allocated to the workers.

Next, the objects identified in the deletion records are actually deleted 1310. Using this live segment structure, the similarity groups (or the compression regions) can be cleaned as discussed, for example, in FIGS. 1B, 11A-11C and 12A-12B.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for marking similarity groups impacted by a garbage collection operation performed in a storage system, the method comprising:
   receiving input identifying objects to be deleted, wherein each of the objects is associated with a recipe;
   removing recipes of the identified objects from an object storage of the storage system to a deletion storage of the storage system such that the identified objects are not visible to users, wherein each of the removed recipes corresponds to a deletion record;
   receiving a list of the deletion records that identify the objects that are to be deleted from the storage system;
   identifying slice recipes for the objects to be deleted from the deletion records;
   marking similarity groups associated with the slice recipes as impacted similarity groups that are associated with segments of the objects in the deletion records;
   generating a mapping of the impacted similarity groups to a map structure that identifies live segments in the impacted similarity groups, the mapping defining an overall size of memory needed for the impacted similarity groups, wherein the map structure allows dead segments associated with the objects to be deleted to be identified and removed from the impacted similarity groups; and
   estimating a number of a plurality of workers to be used to delete the identified dead segments from the storage system using a number of input/output operations used to clean a single impacted similarity group of the impacted similarity groups.

2. The method of claim 1, further comprising cleaning the impacted similarity groups.

3. The method of claim 2, further comprising cleaning compression regions associated with the impacted similarity groups or cleaning only impacted compression regions associated with the impacted similarity groups.

4. The method of claim 1, wherein the list of deletion records includes objects that were fully written to the storage system.

5. The method of claim 1, further comprising identifying the live segments associated with the impacted similarity groups by evaluating the live objects.

6. The method of claim 5, generating the map structure that maps the live segments to compression regions of the impacted similarity groups, wherein segments in the map structure that are not marked correspond to dead segments in the compression regions of the impacted similarity groups.

7. The method of claim 5, further comprising allocating the live objects to the plurality of workers for evaluation and allocating the impacted similarity groups to the plurality of workers configured to clean the impacted similarity groups.

8. The method of claim 7, further comprising cleaning the impacted similarity groups on a basis of impacted compression regions, wherein live segments in the impacted compression regions are carried forward to a new compression region and the impacted compression regions that have been carried forward are deleted in their entirety from the storage system.

9. The method of claim 1, further comprising removing the deletion records.

10. A non-transitory computer readable medium comprising computer executable instructions for implementing a method for marking similarity groups impacted by a garbage collection operation performed in a storage system, the method comprising:
    receiving input identifying objects to be deleted, wherein each of the objects is associated with a recipe;
    removing recipes of the identified objects from an object storage of the storage system to a deletion storage of the storage system such that the identified objects are not visible to users, wherein each of the removed recipes corresponds to a deletion record;
    receiving a list of the deletion records that identify the objects that are to be deleted from the storage system;
    identifying slice recipes for the objects to be deleted from the deletion records;
    marking similarity groups associated with the slice recipes as impacted similarity groups that are associated with segments of the objects in the deletion records;
    generating a mapping of the impacted similarity groups to a map structure that identifies live segments in the impacted similarity groups, the mapping defining an overall size of memory needed for the impacted similarity groups, wherein the map structure allows dead segments associated with the objects to be deleted to be identified and removed from the impacted similarity groups; and
    estimating a number of a plurality of workers to be used to delete the identified dead segments from the storage system using a number of input/output operations used to clean a single impacted similarity group of the impacted similarity groups.

11. The method of claim 10, further comprising cleaning the impacted similarity groups.

12. The method of claim 11, further comprising cleaning compression regions associated with the impacted similarity groups or cleaning only impacted compression regions associated with the impacted similarity groups.

13. The method of claim 10, wherein the list of deletion records includes objects that were not fully written to the storage system.

14. The method of claim 10, further comprising identifying live segments associated with the impacted similarity groups by evaluating the live objects.

15. The method of claim 14, generating the map structure that maps the live segments to compression regions of the impacted similarity groups, wherein segments in the map structure that are not marked correspond to dead segments in the compression regions of the impacted similarity groups.

16. The method of claim 15, further comprising allocating the live objects to the plurality of workers for evaluation and allocating the impacted similarity groups to the plurality of workers configured to clean the impacted similarity groups.

17. The method of claim 16, further comprising cleaning the impacted similarity groups on a basis of impacted compression regions, wherein live segments in the impacted compression regions are carried forward to a new compression region and the impacted compression regions that have been carried forward are deleted in their entirety from the storage system.

18. The method of claim 10, further comprising removing the deletion records.

19. A method for marking similarity groups impacted by a garbage collection operation performed in a storage system, the method comprising:

receiving a list of deletion records that identify objects that are to be deleted from the storage system;

estimating a number of a plurality of workers to be used to delete the identified objects from the storage system;

instantiating the number of the plurality of workers;

identifying similarity groups from the deletion records as impacted similarity groups, wherein the impacted similarity groups store segments associated with the objects that are to be deleted in compression regions;

evaluating live objects or live recipes of the live objects to identify impacted live objects that are associated with the impacted similarity groups;

determining a size of the impacted similarity groups;

estimating a number of a plurality of workers to be used to delete the segments associated with the objects that are to be deleted using a number of input/output operations used to clean a single impacted similarity group of the impacted similarity groups;

instantiating the number of the plurality of workers;

assigning a range of the similarity groups to each of the workers based upon the size of the impacted similarity groups;

generating map structures for the compression regions in the impacted similarity group;

identifying live segments from the live objects or the live recipes and marking the map structures accordingly such that the map structures identify which of the segments in the compression regions are live segments and which of the segments are dead segments, wherein the dead segments are not referenced by any of the live objects or the recipes of the live objects;

cleaning the compression regions of the dead segments by the plurality of workers such that only the live segments remain.

20. The method of claim 19, further comprising cleaning only those compression regions where a ratio of dead segments to live segments is greater than a predetermined threshold and wherein evaluating live objects or live recipes comprises evaluating the live objects or live recipes by the number of the plurality of workers.

* * * * *